(12) United States Patent
Koshiyama

(10) Patent No.: US 8,905,491 B2
(45) Date of Patent: Dec. 9, 2014

(54) BICYCLE RIM

(75) Inventor: Kazuki Koshiyama, Osaka (JP)

(73) Assignee: Shimano Inc., Osaka (JP)

( * ) Notice: Subject to any disclaimer, the term of this patent is extended or adjusted under 35 U.S.C. 154(b) by 581 days.

(21) Appl. No.: 12/843,982

(22) Filed: Jul. 27, 2010

(65) Prior Publication Data

US 2012/0025597 A1   Feb. 2, 2012

(51) Int. Cl.
| B60B 25/00 | (2006.01) |
| B60B 5/02 | (2006.01) |
| B60B 1/00 | (2006.01) |
| B60B 21/02 | (2006.01) |
| B60B 21/04 | (2006.01) |
| B60B 21/06 | (2006.01) |
| B60B 21/08 | (2006.01) |

(52) U.S. Cl.
CPC . *B60B 5/02* (2013.01); *B60B 1/003* (2013.01); *B60B 21/025* (2013.01); *B60B 21/04* (2013.01); *B60B 21/062* (2013.01); *B60B 21/08* (2013.01); *B60B 25/00* (2013.01)
USPC .................. 301/95.102; 301/95.107

(58) Field of Classification Search
USPC ............. 301/95.101–95.104, 95.107
See application file for complete search history.

(56) References Cited

U.S. PATENT DOCUMENTS

| 5,104,199 | A | 4/1992 | Schlanger |
| 6,398,313 | B1 | 6/2002 | Lew |
| 7,464,994 | B2 | 12/2008 | Okajima et al. |
| 7,614,706 | B2 | 11/2009 | Meggiolan et al. |
| 8,002,362 | B2 * | 8/2011 | Colegrove et al. ....... 301/95.103 |
| 2004/0021366 | A1 | 2/2004 | Colegrove |
| 2006/0197369 | A1 * | 9/2006 | Chiu et al. ............... 301/95.102 |
| 2007/0102992 | A1 | 5/2007 | Jager |
| 2008/0265658 | A1 * | 10/2008 | Reuteler ................. 301/95.102 |
| 2008/0296961 | A1 | 12/2008 | Dal Pra' |

FOREIGN PATENT DOCUMENTS

| EP | 1 985 435 A1 | 10/2008 |
| EP | 1 997 647 A1 | 12/2008 |
| GB | 2 423 752 A | 9/2006 |
| WO | WO 2004/074010 A2 | 9/2004 |

OTHER PUBLICATIONS

European Search Report of corresponding EP Application No. 11 16 7720.9 dated Nov. 16, 2011.

* cited by examiner

*Primary Examiner* — Jason Bellinger
(74) *Attorney, Agent, or Firm* — Global IP Counselors

(57) ABSTRACT

A bicycle rim is provided with a pair of circumferential side walls and an outer bridge connecting radial outer ends between the first and second circumferential side walls. At least one of the first and second circumferential side walls includes a first portion of a non-resin material with a first thermal conductivity and a second portion of a non-resin material with a second thermal conductivity. The second portion extends more than half in a circumferential direction along the at least one of the first and second circumferential side walls. The second thermal conductivity of the second portion is higher than the first thermal conductivity of the first portion. The first and second portions at least partially overlaps in a thickness direction of the at least one of the first and second circumferential side walls.

17 Claims, 17 Drawing Sheets

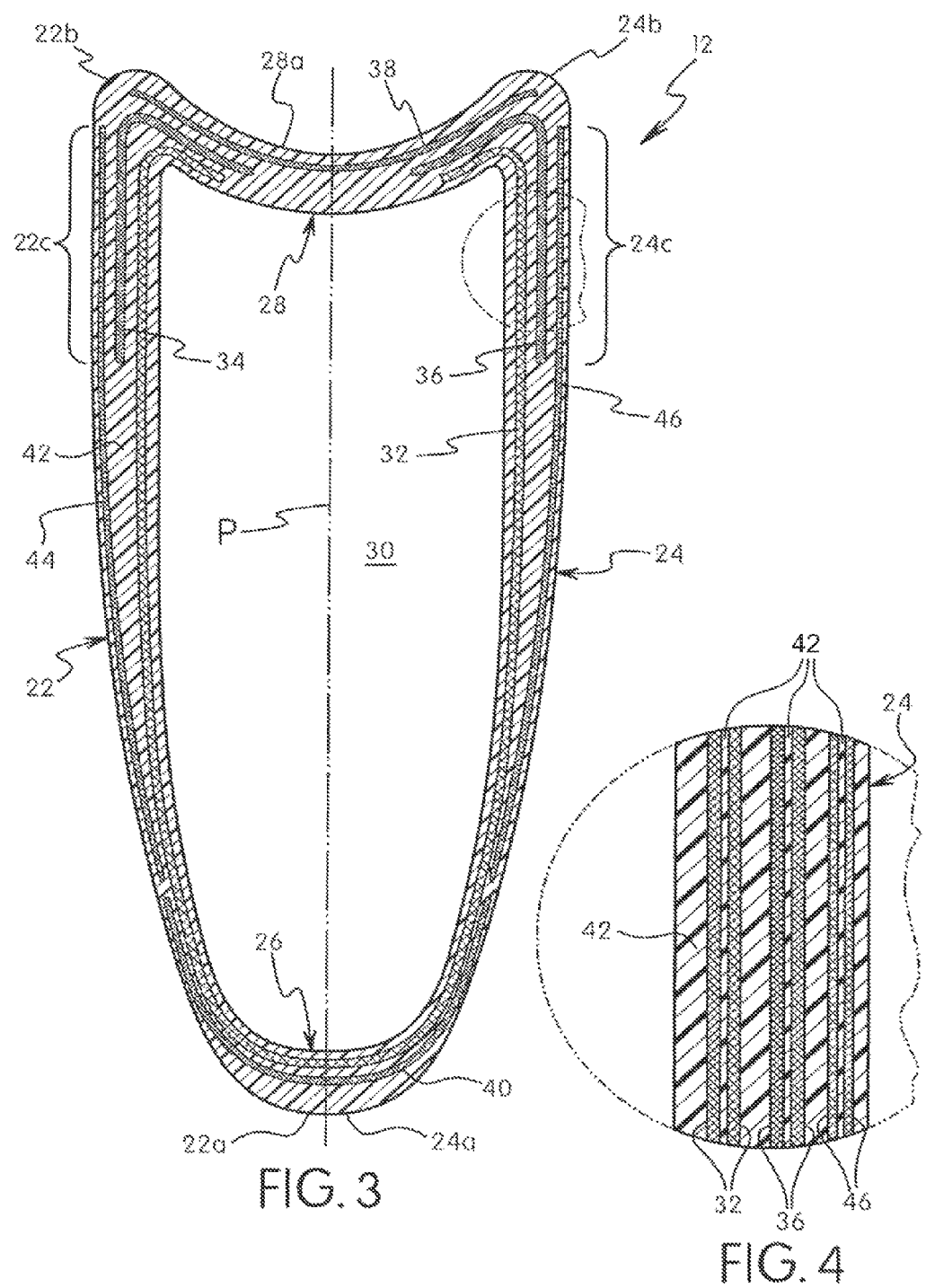

BICYCLE RIM

BACKGROUND

1. Field of the Invention

This invention generally relates to a bicycle rim. More specifically, the present invention relates to a bicycle rim that improves heat dissipation of the heat that is generated due to braking in which the brake pads contacts the side walls of the rim.

2. Background Information

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes.

In the past, most conventional bicycle rims were constructed of various metal materials. However, in more recent years, the bicycle rims have been constructed using composite materials to make them more lightweight. For example, in U.S. Pat. No. 7,464,994, a bicycle rim has been proposed that has a continuously extending resin material covering a portion of an annular metallic rim member. In U.S. Pat. No. 5,104,199, a bicycle rim has been proposed that has a molded body attached to a rim hoop. Also bicycle rims have been proposed that are mainly formed of woven carbon fibers that are impregnated with a thermosetting resin. One example of a bicycle rim that is made primarily of woven carbon fibers is disclosed in U.S. Pat. No. 7,614,706.

One of the most common composite materials used in bicycle rims is a woven carbon fiber material that uses polyacrylonitrile (PAN) based carbon fibers. While bicycle rims that are primarily made of PAN carbon fibers are strong and lightweight, PAN carbon fibers are not capable of quickly dissipating heat. Thus, a rim that brake contact areas made of PAN carbon fibers will not effectively dissipate heat due to braking. In some cases, excessive braking could potentially damage the rim over an extended period of time.

SUMMARY

One aspect is to provide a bicycle rim that improves heat dissipation of the heat that is generated due to braking in which the brake pads contacts the side walls of the rim.

In view of the state of the known technology, one object of this disclosure is to provide a bicycle rim that mainly comprises a first circumferential side wall, a second circumferential side wall and an outer bridge. The first circumferential side wall has a radial inner end and a radial outer end. The second circumferential side wall has a radial inner end and a radial outer end. The outer bridge connects the radial outer ends between the first and second circumferential side walls. At least one of the first and second circumferential side walls includes a first portion of a non-resin material with a first thermal conductivity and a second portion of a non-resin material with a second thermal conductivity. The second portion extends more than half in a circumferential direction along the at least one of the first and second circumferential side walls. The second thermal conductivity of the second portion is higher than the first thermal conductivity of the first portion. The first and second portions at least partially overlaps in a thickness direction of the at least one of the first and second circumferential side walls.

These and other objects, features, aspects and advantages will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure:

FIG. 3 is an enlarged, partial cross-sectional view of the bicycle rim illustrated in FIGS. 1 and 2;

FIG. 4 is a further enlarged, partial cross-sectional view of the circled portion of the bicycle rim illustrated in FIG. 3;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
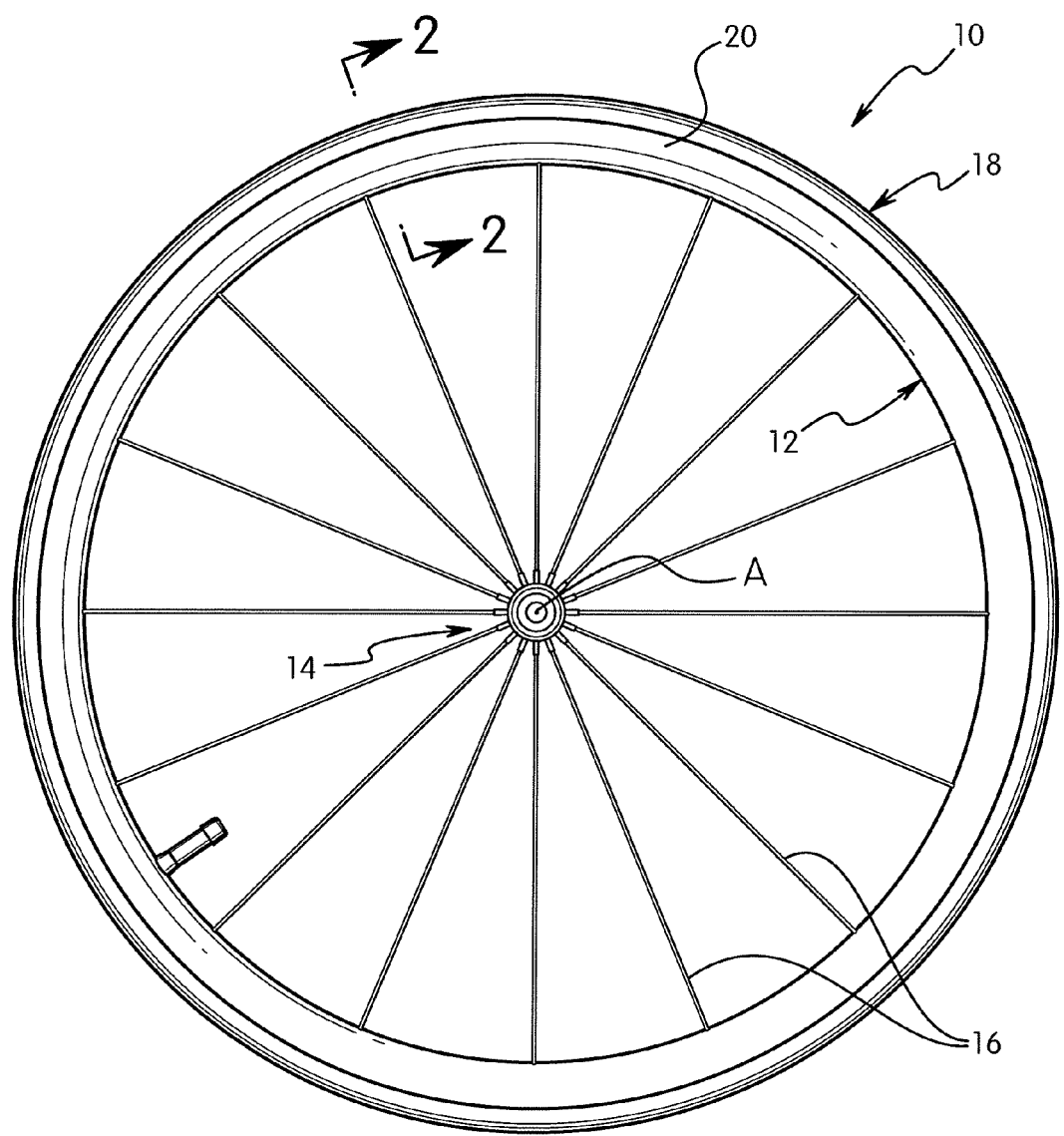
FIG. 1 is a side elevational view of a bicycle wheel that is equipped with a bicycle rim made of a composite material in accordance with a first embodiment.

Referring initially to FIG. 1, a bicycle wheel 10 is illustrated in accordance with a first embodiment. The bicycle wheel 10 basically includes a bicycle rim 12, a center hub 14 and a plurality of spokes 16. As seen in FIG. 1, the rim 12 is an annular member that is designed for rotation about a center rotational axis A formed by the axle of the hub 14. The spokes 16 interconnect the rim 12 and the center hub 14 together in a conventional manner. A pneumatic tire 18 is secured to the outer surface of the rim 12. In this embodiment, the tire 18 is illustrated as a sew-up or tubular tire. However, as explained below, the rim 12 can be configured for other types of tires as needed and/or desired.

Regarding the center hub 14, any type of bicycle hub can be used with the bicycle rim 12. In other words, the precise construction of the center hub 14 is not important. Thus, the center hub 14 will not be discussed and/or illustrated in detail herein. Also, while a front hub is illustrated, the bicycle rim 12 can also be used with a rear hub to form a rear wheel as needed and/or desired.

Likewise, the precise construction of the spokes 16 is not important. The spokes 16 can be any type of spokes or other type of connecting device (e.g., disc-shaped connecting member). Thus, the spokes 16 will not be discussed and/or illustrated in detail herein. In the illustrated embodiment, the spokes 16 are radial tension spokes that connect the hub 14 to the rim 12. For example, eight of the spokes 16 extend to one side of the hub 14, while the other eight spokes 16 extend to the other side of the hub 14, as explained below. In the illustrated embodiment, the hub 14 is a front hub (i.e. the hub 14 does not include one or more sprockets) that utilizes sixteen radial spokes 16 coupled to the rim 12 at equally spaced circumferential locations as seen in FIG. 1. Of course, it will be apparent to those skilled in the art from this disclosure that the rim 12 could use be modified to accommodate different spoking arrangements (e.g. all tangential spokes, some tangential spokes and some radial spokes, etc.) without departing from the scope of the present invention. Also, it will also be apparent to those skilled in the art from this disclosure that the rim 12 could use be modified to accommodate fewer or more sixteen spokes if needed and/or desired. In any case, the spokes 16 are preferably coupled to the annular rim 12 in a circumferentially spaced arrangement.

Figure 2:
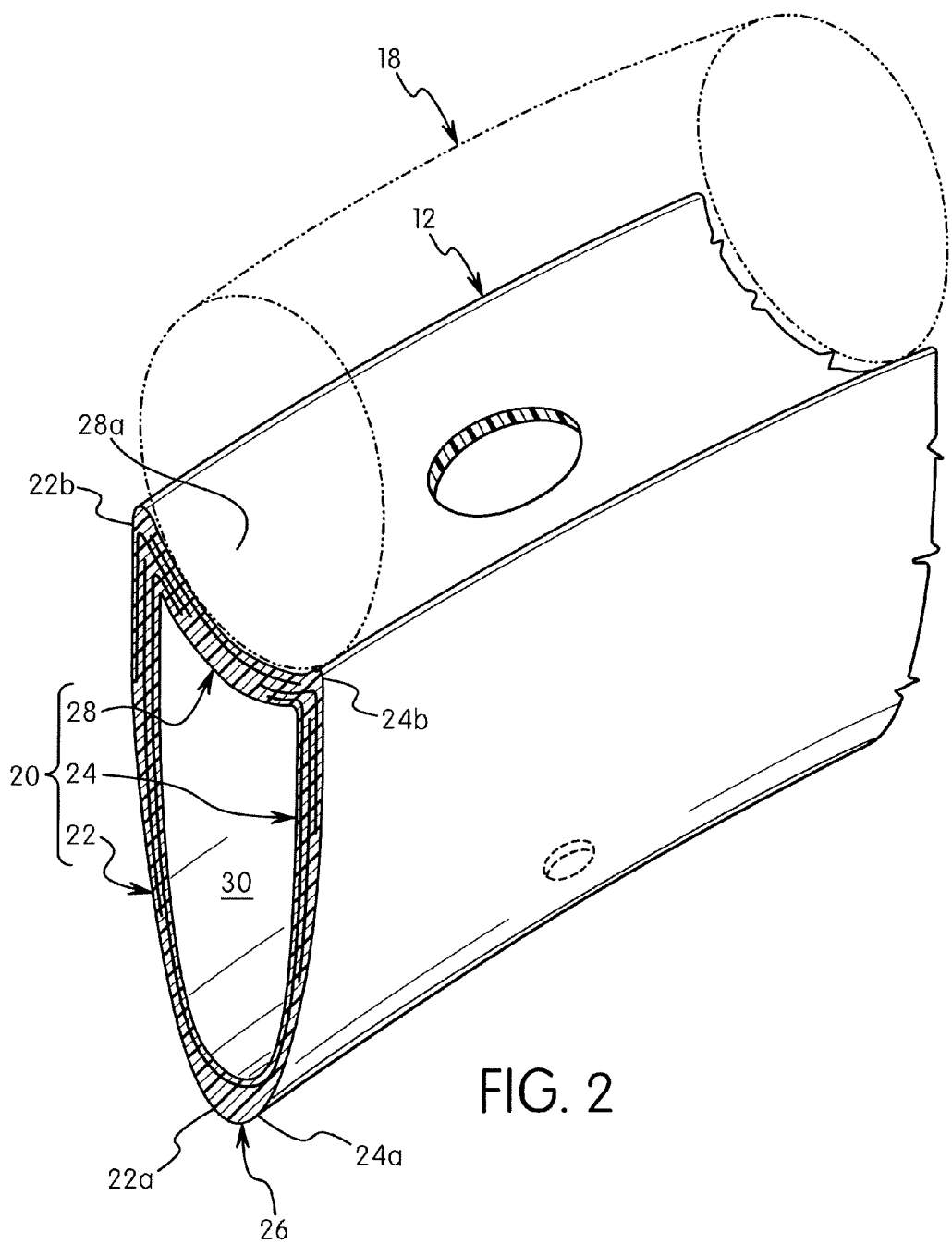
FIG. 2 is an enlarged, partial perspective view of the bicycle rim illustrated in FIG. 1, with the tire installed thereon, as seen along section line 2-2 in FIG. 1.

As seen in FIGS. 2 and 3, the rim 12 has a center plane P that bisects the rim 12 into two halves. The center plane P is perpendicular to the center rotational axis A that coincides with the axle of the hub 14. As explained below, in the first illustrated embodiment, the rim 12 is either a completely non-metallic composite member, or a composite member that is completely non-metallic but for a heat dissipation member disposed in the rim 12 to dissipate the heat that is generated due to braking in which the brake pads contacts the side walls of the rim 12. While the rim 12 is symmetrically illustrated in FIG. 3 with respect to the center plane P, the rim 12 does not need to be symmetrical with respect to the center plane P. Thus, the rim 12 can be non-symmetrical with respect to the center plane P as needed and/or desired.

The rim 12 basically includes a main body 20 having a first circumferential side wall 22 and a second circumferential side wall 24. The first circumferential side wall 22 has a radial inner end 22a and a radial outer end 22b. The second circumferential side wall 24 has a radial inner end 24a and a radial outer end 24b. The first and second circumferential side walls 22 and 24 are connected at their radial inner ends 22a and 24a to form an inner annular portion 26. The radial outer ends 22b and 24b of the first and second circumferential side walls 22 and 24 are connected together by an annular outer bridge 28 that is part of the main body 20. The annular outer bridge 28 extends between the first and second circumferential side walls 22 and 24.

Also, the inner annular portion 26 has a plurality of spoke attachment openings for receiving the spokes 16. The annular outer bridge 28 is provided with a plurality of spoke access openings for accessing the spokes 16. Thus, the number of the spoke access openings corresponds to the number of the spoke attachment openings, which corresponds to the number of the spokes 16. The annular outer bridge 28 can include one or more covers for closing the spoke access openings as needed and/or desired. The inner annular portion 26 and the annular outer bridge 28 also a tire fill valve opening (not shown).

The main body 20 of the rim 12 has an overall uniform cross sectional profile about its entire circumference that forms a circular loop around the center rotational axis A. In particular, the term "overall uniform cross sectional profile" as used herein refers to the cross sectional outline of a single section of the rim 12 as seen in FIG. 3. Thus, whether the cross section of the rim 12 includes the spoke attachment openings or not, the cross sectional outline of the rim body remains unchanged.

The first circumferential side wall 22 includes a first brake contact area 22c that is located adjacent the radial outer end 22b. The second circumferential side wall 24 includes a second brake contact area 24c that is located adjacent the radial outer end 24b. The first and second brake contact areas 22c and 24c are formed by oppositely facing exterior surfaces that are contacted by brake pads during a braking operation.

The outer bridge 28 has an annular outer surface 28a that is concaved and transversely curved with respect to the center plane P of the rim 12 to form an annular tire engagement structure for attaching the tire 18 thereon. Also in the illustrated embodiment, the first and second circumferential side walls 22 and 24 and the annular outer bridge 28 form an annular interior space or area 30. This interior space or area 30 can be empty or filled with a foam material or the like.

As seen in FIGS. 3 and 4, in the first illustrated embodiment, the first and second circumferential side walls 22 and 24 and the annular outer bridge 28 of the main body 20 are basically formed by laminating a plurality of structural support layers 32, 34, 36, 38 and 40 together with a binder material 42. The first circumferential side wall 22 is also provided with a thermally conductive layer 44, while the second circumferential side wall 24 is also provided with a second thermally conductive layer 46. The thermally conductive layers 44 and 46 are configured and arranged with respect to the structural support layers 32, 34, 36, 38 and 40 to heat dissipation of the heat generated in the first and second brake contact areas 22c and 24c due to braking in which the brake pads contacts the first and second brake contact areas 22c and 24c of the rim 12.

As will become apparent from the following description of the main body 20 of the rim 12, the structural support layers 32, 34, 36, 38 and 40 constitutes an annular first portion of the main body 20, while the thermally conductive layers 44 and 46 constitutes an annular second portion of the main body 20. The first and second portions at least partially overlap in a thickness direction of the first and second circumferential side walls 22 and 24. The first portion (the structural support layers 32, 34, 36, 38 and 40) of the main body 20 is a non-resin material with a first thermal conductivity. The second portion (the thermally conductive layers 44 and 46) of the main body 20 is a non-resin material with a second thermal conductivity. Thus, each of the first and second circumferential side walls 22 and 24 includes a part of the first portion (the structural support layers 32, 34, 36, 38 and 40) with the first thermal conductivity and a part of the second portion (the thermally conductive layers 44 and 46) with the second thermal conductivity. In the illustrated embodiment, the main body 20 is symmetrical in construction and configuration with respect to the center plane P.

In the illustrated embodiment, the second portion (the thermally conductive layers 44 and 46) of the main body 20 is a continuously arranged the circumferential direction of the main body 20 of the rim 12 in the first illustrated embodiment. However, alternatively, the second portion (the thermally conductive layers 44 and 46) of the main body 20 is a discontinuously arranged the circumferential direction of the main body 20 of the rim 12. For example, the thermally conductive layers 44 and 46 can be two or more arc shaped members that are circumferentially spaced apart. In any event, the second portion (the thermally conductive layers 44 and 46) extends circumferentially along the first and second circumferential side walls 22 and 24 such that the second portion (the thermally conductive layers 44 and 46) spans more than half of the circumferential distance of the first and second circumferential side walls 22 and 24.

In the first illustrated embodiment, the structural support layers 32, 34, 36, 38 and 40 (the first portion) are non-metallic layers, while the thermally conductive layers 44 and 46 (the second portion) includes at least one highly conductive layer made of a metallic material or a thermally conductive non-metallic. In this way, the main body 20 of the rim 12 is either a completely non-metallic composite member, or a composite member that is completely non-metallic but for the thermally conductive layers 44 and 46 (the second portion) that act as a heat dissipation member in the main body 20 of the rim 12 to dissipate the heat that is generated due to braking in which the brake pads contacts the side walls of the rim 12.

In the case of a metallic material being used for the thermally conductive layers 44 and 46, an aluminum alloy with a thermally conductivity of about 237 W/m·K is one example of a suitable metallic material. The thermally conductive layers 44 and 46 are not limited by aluminum. For example, copper can also be used as an alloy layer for each of the thermally conductive layers 44 and 46. In the case of a thermally conductive non-metallic being used for the thermally conductive layers 44 and 46, a carbon material such as pitch based carbon fibers with a thermally conductivity of 50-500 W/m·K is one example of a suitable non-metallic material. Each of the thermally conductive layers 44 and 46 will typically be about 0.1 mm to about 0.5 mm in thickness with the rim 12 having a thickness ranging from about 0.6 mm at the middle of each of the first and second circumferential side walls 22 and 24 to about 1.0-1.5 mm at the first and second brake contact areas 22c and 24c.

In the first illustrated embodiment, the structural support layers 32, 34, 36, 38 and 40 are non-metallic fiber layers that are formed with the binder material 42 using a prepreg sheet of fiber-reinforced polymer material such that at least a majority of the first and second circumferential side walls 22 and 24 and the outer bridge 26 of the main body 20 are formed the fiber-reinforced polymer material. For example, as in the illustrated embodiment, a prepreg sheet of fiber-reinforced plastic or polymer (FRP), which is made of a polymer matrix that is reinforced with fibers, can be used to form the structural support layers 32, 34, 36, 38 and 40 as well as the binder material 42. The fibers the structural support layers 32, 34, 36, 38 and 40 are usually fiberglass, carbon, or aramid, while the polymer of the structural support layers 32, 34, 36, 38 and 40 is usually, vinylester or polyester thermosetting plastic or other suitable non-metallic material. The fibers of the fiber-reinforced plastic or polymer (FRP) cloth can be, for example, carbon fibers, fiberglass fibers, Aramid fibers, or any other suitable non-metallic fibers. The fibers of the structural support layers 32, 34, 36, 38 and 40 can be arranged as randomly oriented fibers and/or unidirectional fibers. In the illustrated embodiment, the structural support layers 32, 34, 36, 38 and 40 are a thin sheet of continuous reinforcement fibers that is impregnated with a thermoset resin or a thermoplastic resin, which is often called prepreg sheets. For example, in the illustrated embodiment, e structural support layers 32, 34, 36, 38 and 40 is a fiber reinforced synthetic material having an epoxy resin impregnated with carbon fibers such as polyacrylonitrile (PAN) based carbon fibers.

When using carbon fibers for the construction of the thermally conductive layers 44 and 46, the thin prepreg sheet of continuous reinforcement fibers that is impregnated with a thermoset resin or a thermoplastic resin. However, in contrast to the polyacrylonitrile (PAN) based carbon fibers used for the structural support layers 32, 34, 36, 38 and 40 that has a thermally conductivity of below 10 W/m·K, the thermally conductive layers 44 and 46 are constructed of pitch based carbon fibers with a thermally conductivity of 50-500 W/m·K or more. When the rim 12 is formed, all of the carbon layers and alloy layers, if used, are bonded together by the resin or binder material 42. In general, the carbon layers of the structural support layers 32, 34, 36, 38 and 40 fuse one with the resin (e.g., epoxy) of the binder material 42. Generally speaking, the pitch based carbon fibers of the thermally conductive layers 44 and 46 have lower strength than the polyacrylonitrile (PAN) based carbon fibers of the structural support layers 32, 34, 36, 38 and 40.

In Figures, the structural support layers 32, 34, 36, 38 and 40 with respect to the thermally conductive layers 44 and 46 are only schematically illustrated. Thus, the thickness dimensions of the structural support layers 32, 34, 36, 38 and 40 with respect to the binder material 42 are not necessarily to scale with respect to each other. Moreover, the thickness the structural support layers 32, 34, 36, 38 and 40 vary from portion to portion of the rim 12. For example, the thickness at the middle of each of the first and second circumferential side walls 22 and 24 is about 0.6 mm, while the thickness at each of the first and second brake contact areas 22c and 24c is about 1.0-1.5 mm. However, the relative locations and/or the positional relationships of the structural support layers 32, 34, 36, 38 and 40 with respect to the thermally conductive layers 44 and 46 are accurately depicted. Of course, variations of the relative locations and/or the positional relationships of the structural support layers 32, 34, 36, 38 and 40 with respect to the thermally conductive layers 44 and 46 are possible to the extent that the variations do not significantly deviate from their intended function and/or purpose.

As seen in FIG. 4, the structural support layers 32 and 36 and the thermally conductive layer 46 are each made of two or more prepreg sheets (only two illustrated for the sake of simplicity). The other structural support layers 34, 38 and 40 and the other thermally conductive layer 44 have similar constructions to those shown in FIG. 4. In any case, in the illustrated embodiment, two or more unidirectional prepreg sheets are typically used for each of the structural support layers 32, 34, 36, 38 and 40 and each of the thermally conductive layers 44 and 46 with each adjacent sheet having its carbon fibers angled with respect to the next adjacent sheet.

The prepreg sheets are not limited to unidirectional prepreg sheets. The prepreg sheets can also have twill pattern if desired.

With the thermally conductive layers 44 and 46 having a higher thermal conductivity than the thermal conductivity structural support layers 32, 34, 36, 38 and 40, the main body 20 can quickly dissipate the heat generated due to friction from a braking operation. Accordingly, the main body 20 made of all-carbon fiber reinforced polymer will not degrade due to overheating.

In the case of the rim 12 of FIG. 3, the thermally conductive layer 44 (the second portion) overlies the structural support layers 32 and 34 (the first portion) along the brake contact area 22c, while the thermally conductive layer 46 (the second portion) overlies the structural support layers 32 and 36 (the first portion) along the brake contact area 24c. Thus, the thermally conductive layers 44 and 46 (the second portion) are the externally most non-resin layers of the first and second circumferential side walls 22 and 24, respectively. In other words, the thermally conductive layers 44 and 46 (the second portion) are disposed outside of the structural support layers 32, 34 and 36 (the first portion) in the thickness direction with respect to the center plane P.

The thermally conductive layers 44 and 46 extend from the brake contact areas 22c and 24c to at least a radial middle of the first and second circumferential side walls 22 and 24 with respect to the radial direction of the bicycle rim 12. Thus, the thermally conductive layers 44 and 46 (the second portion) are disposed at least partially radially inward of the brake contact areas 22c and 24c with respect to the radial direction of the bicycle rim 12.

Figure 5:
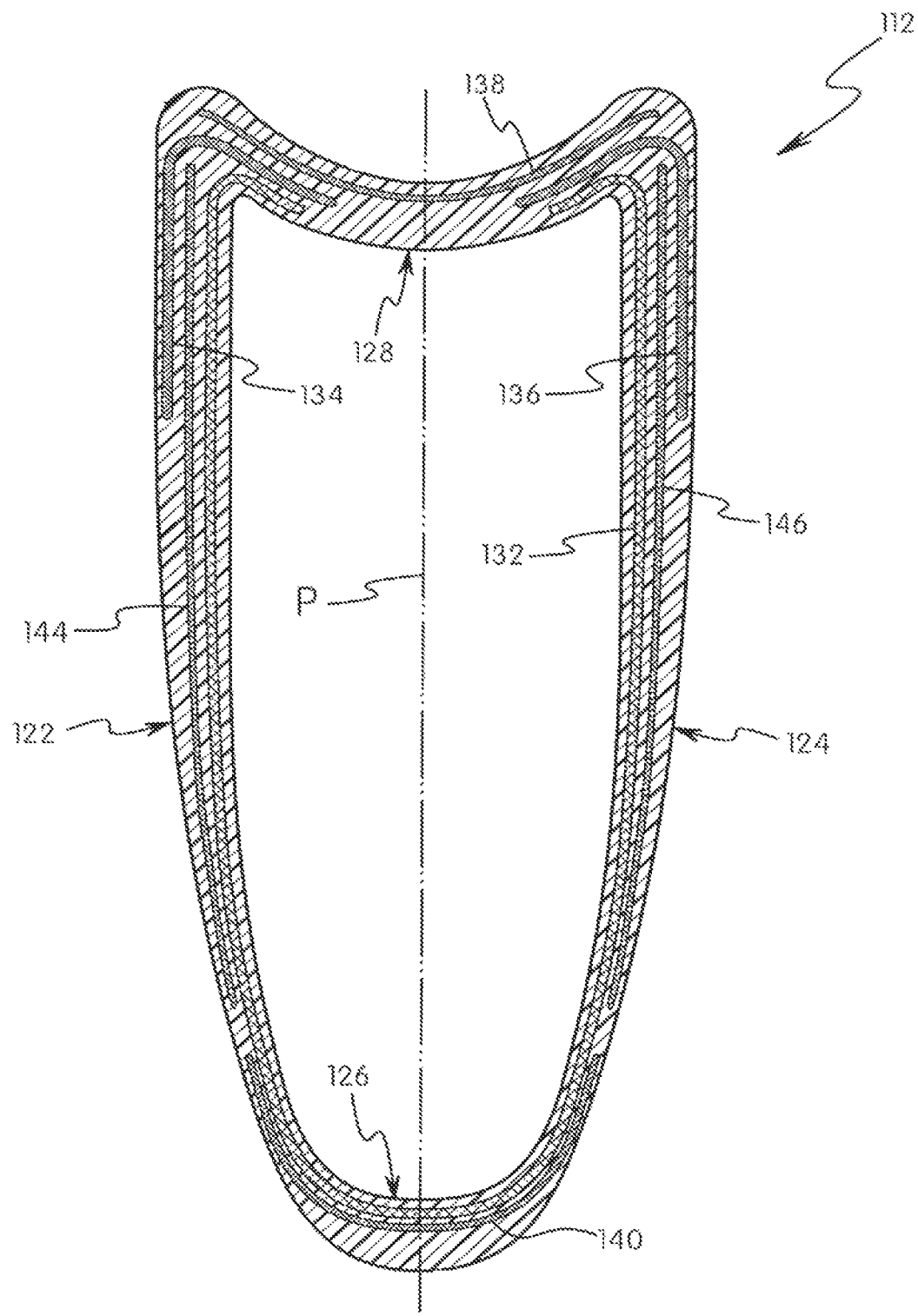
FIG. 5 is an enlarged, partial cross-sectional view of a bicycle rim in accordance with a first variation of the first embodiment.

Referring now to FIG. 5, a bicycle rim 112 is illustrated in accordance with a first variation of the first embodiment. The bicycle rim 112 is made of primarily of a non-metallic composite material. The rim 112 is attached to the hub 14 by the spokes 16 in the same manner as the rim 12 to form a wheel such as seen in FIG. 1. The rim 112 basically includes first and second circumferential side walls 122 and 124 that are connected at their inner ends to form an inner annular portion 126. The outer ends of the first and second circumferential side walls 122 and 124 are connected together by an annular tire engagement portion 128. The only difference between the rims 12 and 112 is the arrangement and configuration the layers. In view of the similarity between the rims 12 and 112, the descriptions of the parts of the first variation of the first embodiment that are essential identical in function to the parts of the first embodiment have been omitted for the sake of brevity.

Here, in the bicycle rim 112 of FIG. 5, the bicycle rim 112 includes annular structural support layers 132, 134, 136, 138 and 140 (the first portion) and a pair of annular thermally conductive layers 144 and 146 (the second portion). The structural support layers 132, 134, 136, 138 and 140 are basically the same as the structural support layers 32, 34, 36, 38 and 40, as discussed above. However, in this first variation of the first embodiment, the thermally conductive layer 144 (the second portion) is disposed in between the structural support layers 132 and 134 (i.e., two fiber layers forming the first portion) with respect to the thickness direction, and the thermally conductive layer 146 (the second portion) is disposed in between the structural support layers 132 and 136 (i.e., two fiber layers forming the first portion) with respect to the thickness direction. Also in the bicycle rim 112 of FIG. 5, the thermally conductive layers 144 and 146 (the second portion) extends from their brake contact areas of the first and second circumferential side walls to at least radial middle of the at least one of the first and second circumferential side walls 122 and 124 with respect to the rotational center axis of the bicycle rim 112.

Figure 6:
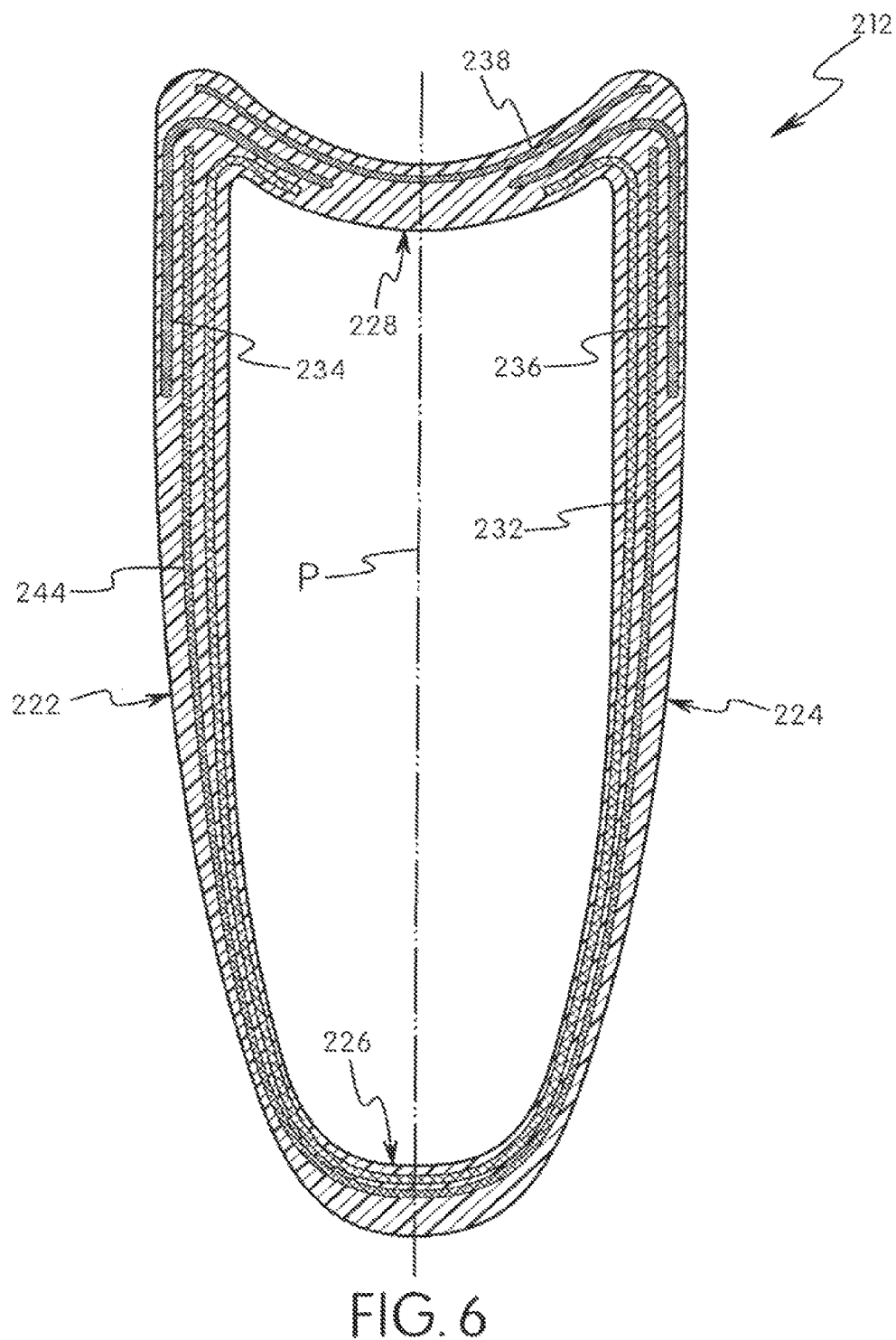
FIG. 6 is an enlarged, partial cross-sectional view of a bicycle rim in accordance with a second variation of the first embodiment.

Referring now to FIG. 6, a bicycle rim 212 is illustrated in accordance with a second variation of the first embodiment. The bicycle rim 212 is made of a composite material. The rim 212 is attached to the hub 14 by the spokes 16 in the same manner as the rim 12 to form a wheel such as seen in FIG. 1. The rim 212 basically includes first and second circumferential side walls 222 and 224 that are connected at their inner ends to form an inner annular portion 226. The outer ends of the first and second circumferential side walls 222 and 224 are connected together by an annular tire engagement portion 228. The only difference between the rims 12 and 212 is the arrangement and configuration the layers. In view of the similarity between the rims 12 and 212, the descriptions of the parts of the second variation of the first embodiment that are essential identical in function to the parts of the first embodiment have been omitted for the sake of brevity.

Here, in the bicycle rim 212 of FIG. 6, the bicycle rim 212 includes annular structural support layers 232, 234, 236, 238 and 240 (the first portion) and a annular thermally conductive layer 244 (the second portion). The structural support layers 232, 234, 236, 238 and 240 are basically the same as the structural support layers 32, 34, 36, 38 and 40, as discussed above. However, in this second variation of the first embodiment, the thermally conductive layers 44 and 46 of FIG. 3 have been connected along the inner annular portion 226 to form the thermally conductive layer 244 of this second variation. Thus, in this second variation of the first embodiment, the thermally conductive layer 244 extends from the brake contact areas of the first and second circumferential side walls 222 and 224 to the inner annular portion 226 (i.e., the most radial inner portion) of the first and second circumferential side walls 222 and 224 with respect to the rotational center axis of the bicycle rim 212.

Also, in the bicycle rim 212, the thermally conductive layer 244 (the second portion) is disposed in between the structural support layers 232 and 234 (i.e., two fiber layers forming the first portion) with respect to the thickness direction at the first brake contact area, and disposed in between the structural support layers 232 and 236 (i.e., two fiber layers forming the first portion) with respect to the thickness direction at the second brake contact area.

Figure 7:
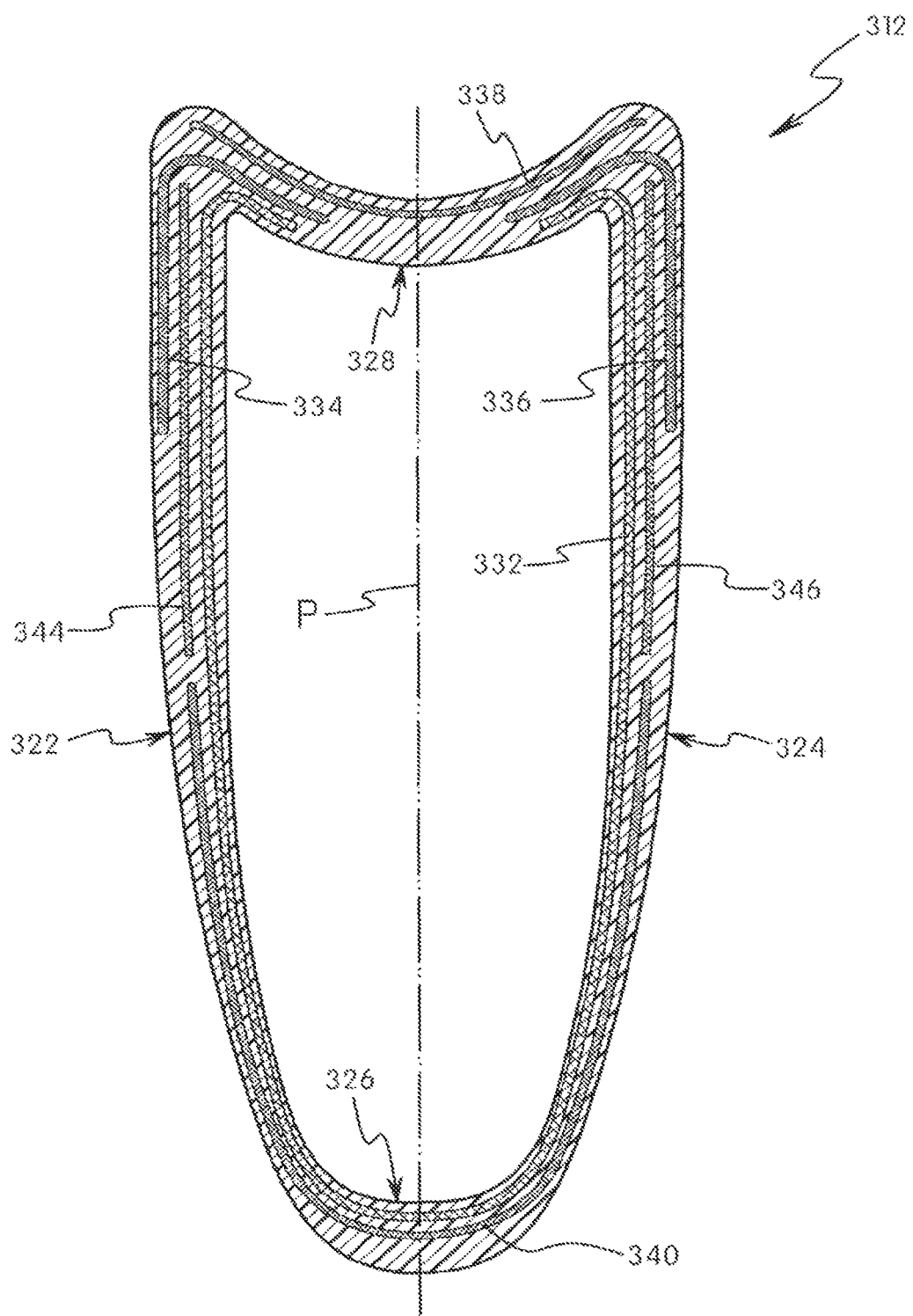
FIG. 7 is an enlarged, partial cross-sectional view of a bicycle rim in accordance with a third variation of the first embodiment.

Referring now to FIG. 7, a bicycle rim 312 is illustrated in accordance with a third variation of the first embodiment. The bicycle rim 312 is made of a composite material. The rim 312 is attached to the hub 14 by the spokes 16 in the same manner as the rim 12 to form a wheel such as seen in FIG. 1. The rim 312 basically includes first and second circumferential side walls 322 and 324 that are connected at their inner ends to form an inner annular portion 326. The outer ends of the first and second circumferential side walls 322 and 324 are connected together by an annular tire engagement portion 328. The only difference between the rims 12 and 312 is the arrangement and configuration of the layers. In view of the similarity between the rims 12 and 312, the descriptions of the parts of the third variation of the first embodiment that are essential identical in function to the parts of the first embodiment have been omitted for the sake of brevity.

Here, in the bicycle rim 212 of FIG. 6, the bicycle rim 212 includes annular structural support layers 232, 234, 236, and 238 (the first portion) and a annular thermally conductive layer 244 (the second portion). The structural support layers 232, 234, 236, and 238 are basically the same as the structural support layers 32, 34, 36, 38 and 40, as discussed above. However, in this second variation of the first embodiment, the thermally conductive layers 44 and 46 of FIG. 3 have been connected along the inner annular portion 226 to form the thermally conductive layer 244 of this second variation. Thus, in this second variation of the first embodiment, the thermally conductive layer 244 extends from the brake contact areas of the first and second circumferential side walls 222 and 224 to the inner annular portion 226 (i.e., the most radial inner portion) of the first and second circumferential side walls 222 and 224 with respect to the rotational center axis of the bicycle rim 212.

In the case of the rim 312 of FIG. 7, the thermally conductive layer 344 (the second portion) is in between the structural support layers 332 and 334 (the first portion) along the brake contact area, while the thermally conductive layer 346 (the second portion) is in between the structural support layers 332 and 336 (the first portion) along the brake contact area. Thus, the thermally conductive layers 344 and 346 (the second portion) are middle non-resin layers of the first and second circumferential side walls 322 and 324, respectively. The thermally conductive layers 344 and 346 extend from the brake contact areas to a radial middle of the first and second circumferential side walls 322 and 324 with respect to the radial direction of the bicycle rim 312.

Figure 8:
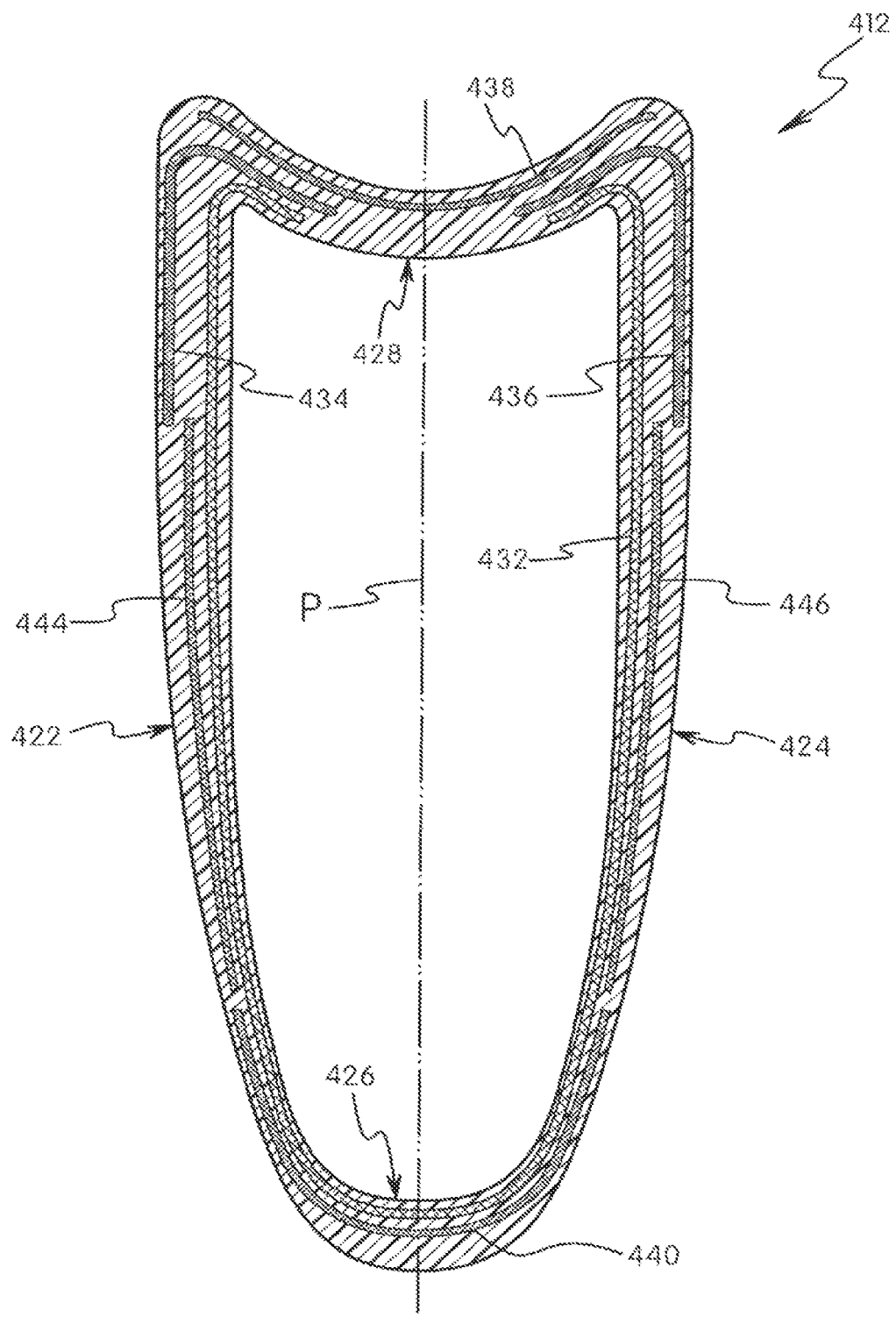
FIG. 8 is an enlarged, partial cross-sectional view of a bicycle rim in accordance with a fourth variation of the first embodiment.

Referring now to FIG. 8, a bicycle rim 412 is illustrated in accordance with a fourth variation of the first embodiment. The bicycle rim 412 is made of a composite material. The rim 212 is attached to the hub 14 by the spokes 16 in the same manner as the rim 12 to form a wheel such as seen in FIG. 1. The rim 412 basically includes first and second circumferential side walls 422 and 424 that are connected at their inner ends to form an inner annular portion 426. The outer ends of the first and second circumferential side walls 422 and 424 are connected together by an annular tire engagement portion 428. The only difference between the rims 12 and 412 is the arrangement and configuration the layers. In view of the similarity between the rims 12 and 412, the descriptions of the parts of the fourth variation of the first embodiment that are essential identical in function to the parts of the first embodiment have been omitted for the sake of brevity.

Here, in the bicycle rim 412 of FIG. 8, the bicycle rim 412 includes annular structural support layers 432, 434, 436, 438 and 440 (the first portion) and a pair of annular thermally conductive layers 444 and 446 (the second portion). The structural support layers 432, 434, 436, 438 and 440 are basically the same as the structural support layers 32, 34, 36, 38 and 40, as discussed above. However, in this variation of the first embodiment, the thermally conductive layers 444 and 446 (the second portion) are external non-resin layers of the first and second circumferential side walls 422 and 424 that are offset radially inward from brake contact areas with respect to the rotational center axis of the bicycle rim 412.

Figure 9:
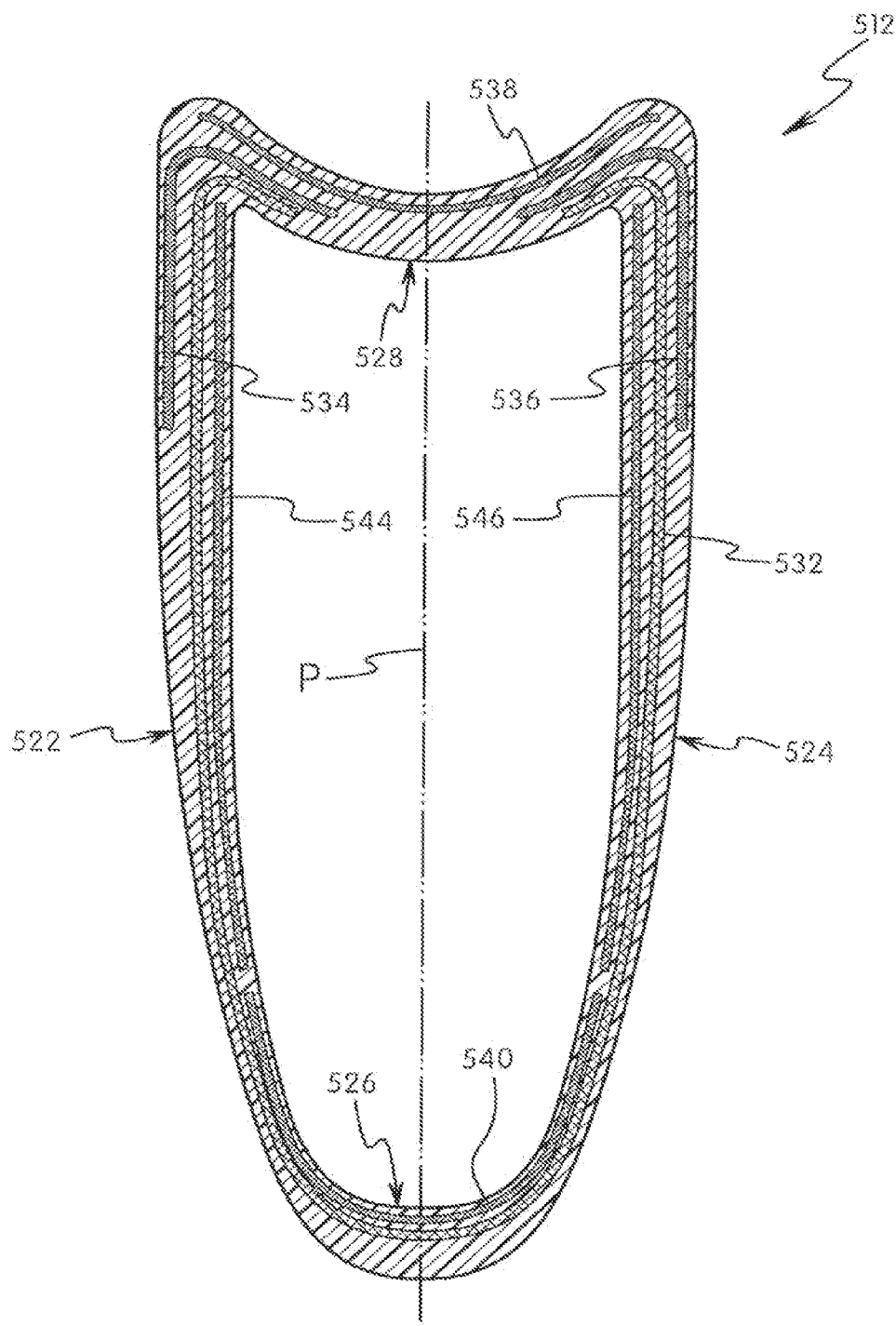
FIG. 9 is an enlarged, partial cross-sectional view of a bicycle rim in accordance with a fifth variation of the first embodiment.

Referring now to FIG. 9, a bicycle rim 512 is illustrated in accordance with a fifth variation of the first embodiment. The bicycle rim 512 is made of a composite material. The rim 512 is attached to the hub 14 by the spokes 16 in the same manner as the rim 12 to form a wheel such as seen in FIG. 1. The rim 512 basically includes first and second circumferential side walls 522 and 524 that are connected at their inner ends to form an inner annular portion 526. The outer ends of the first and second circumferential side walls 522 and 524 are connected together by an annular tire engagement portion 528. The only difference between the rims 12 and 512 is the arrangement and configuration the layers. In view of the similarity between the rims 12 and 512, the descriptions of the parts of the fifth variation of the first embodiment that are essential identical in function to the parts of the first embodiment have been omitted for the sake of brevity.

Here, in the bicycle rim 512 of FIG. 9, the bicycle rim 512 includes annular structural support layers 532, 534, 536, 538 and 540 (the first portion) and a pair of annular thermally conductive layers 544 and 546 (the second portion). The structural support layers 532, 534, 536, 538 and 540 are basically the same as the structural support layers 32, 34, 36, 38 and 40, as discussed above. However, in this variation of the first embodiment, the thermally conductive layers 544 and 546 (the second portion) are disposed inside of all of the structural support layers 532, 534 and 536, (the first portion) that form the first and second circumferential side walls 522 and 524 such that the thermally conductive layers 544 and 546 are internally most layers of the first and second circumferential side walls 522 and 524. Similar to prior variations, the thermally conductive layers 544 and 546 also extends from the brake contact areas to at least radial middle of first and second circumferential side walls 522 and 524 with respect to the rotational center axis of the bicycle rim 512.

In other words, the thermally conductive layers 544 and 546 (the second portion) are disposed inside of the structural support layers 532, 534 and 536, (the first portion) that form the first and second circumferential side walls 522 and 524 in the thickness direction with respect to the center plane P.

Figure 10:
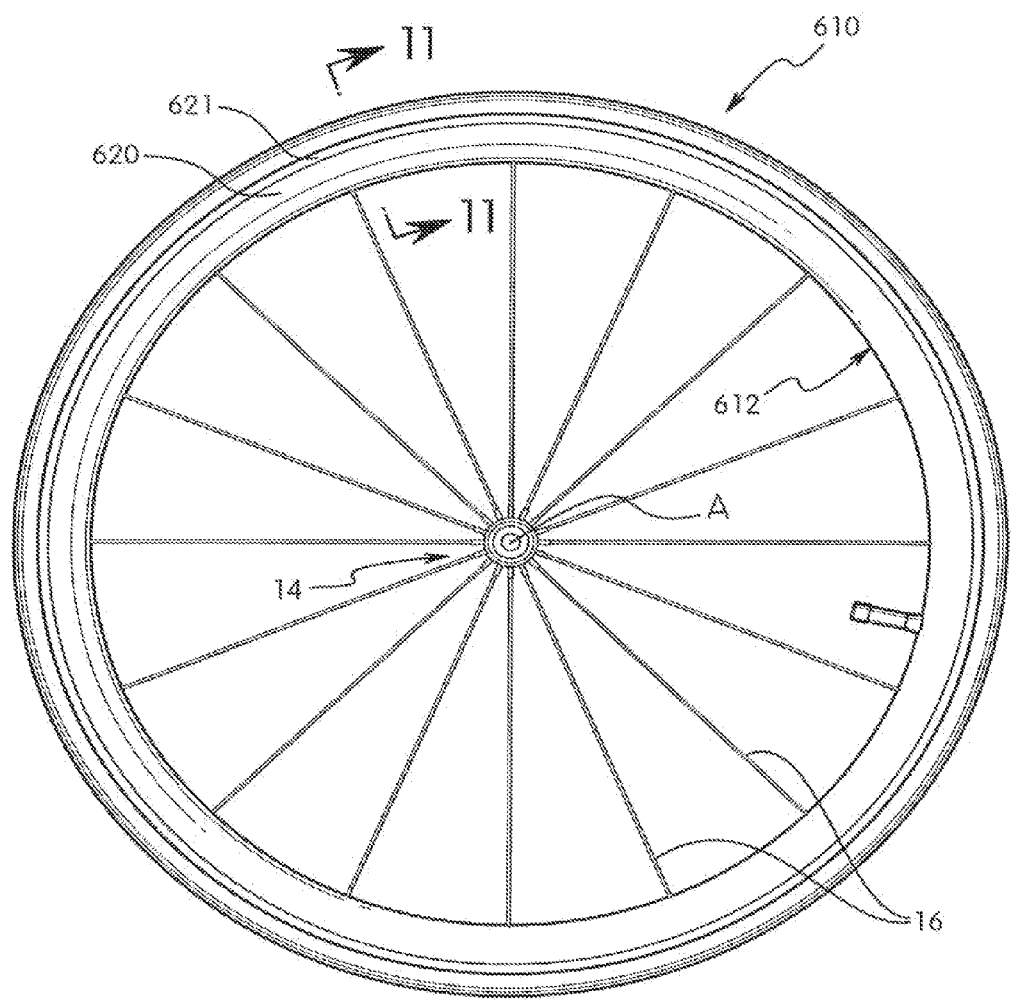
FIG. 10 is a side elevational view of a bicycle wheel that is equipped with a bicycle rim made of a metal outer ring and a composite material body in accordance with a second embodiment.
Figure 11:
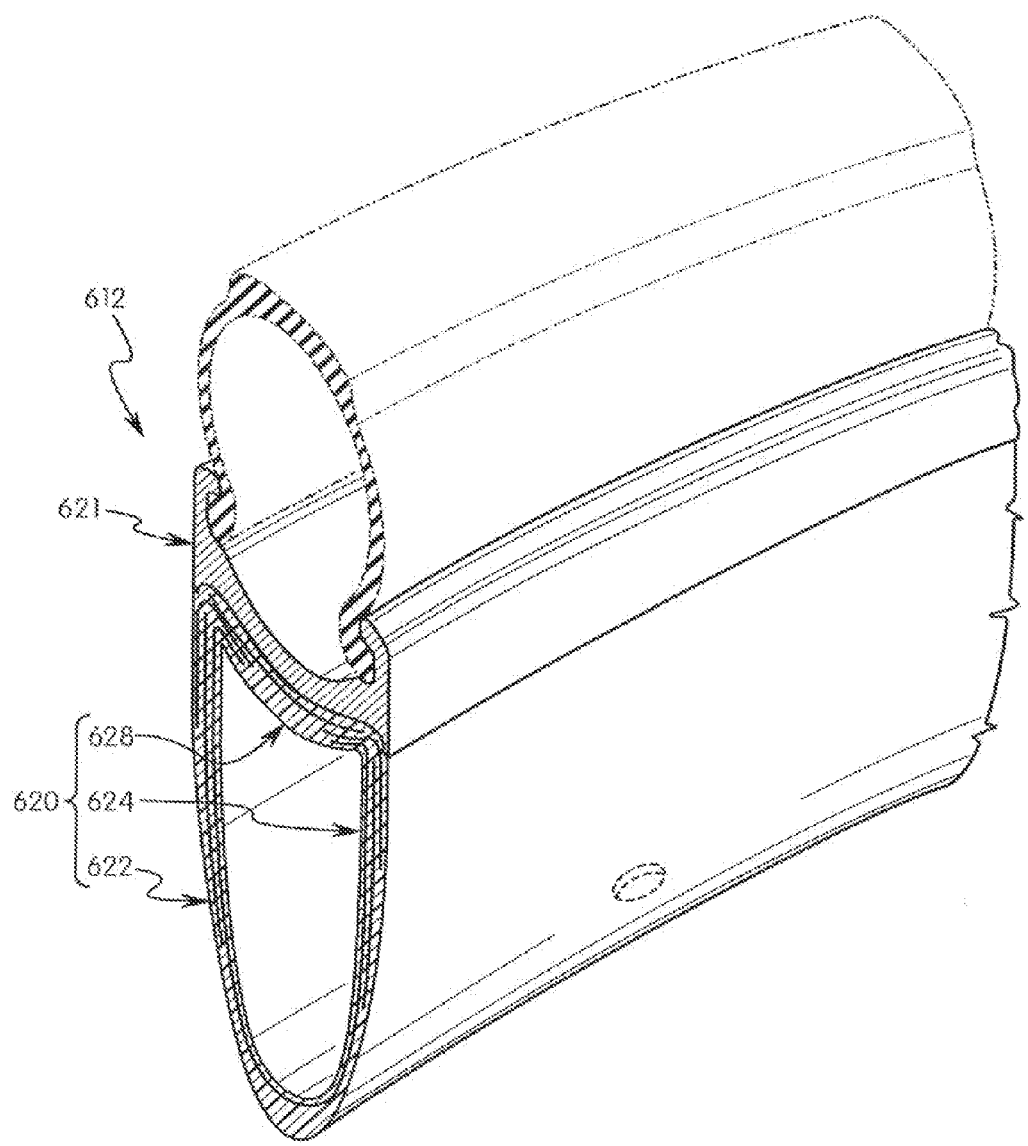
FIG. 11 is an enlarged, partial perspective view of the bicycle rim illustrated in FIG. 1, with the tire installed thereon, as seen along section line 11-11 in FIG. 10.
Figure 12:
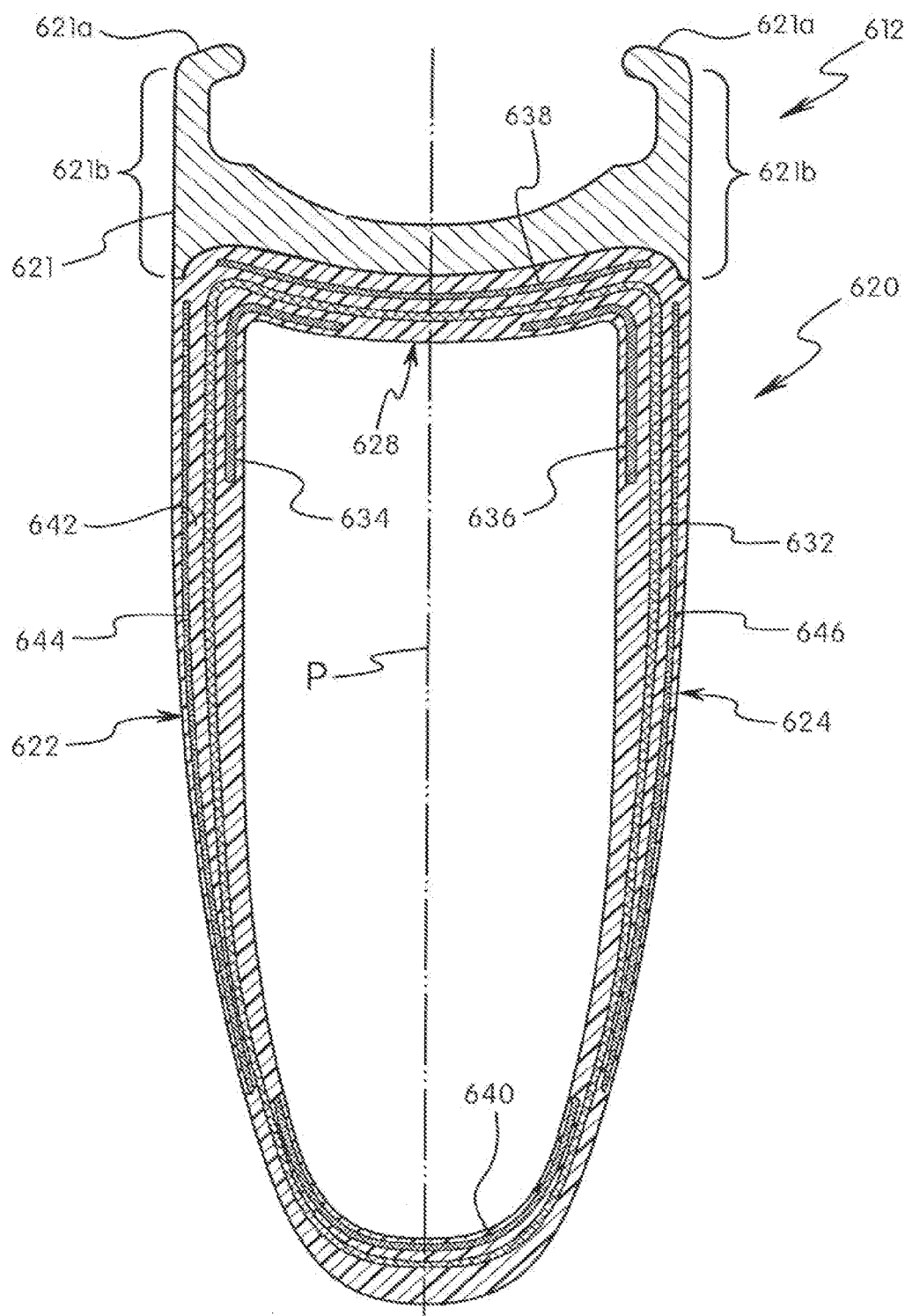
FIG. 12 is an enlarged, partial cross-sectional view of the bicycle rim illustrated in FIGS. 10 and 11.

Referring now to FIGS. 10 to 12, a bicycle wheel 612 is illustrated that is equipped with a bicycle rim in accordance with a second embodiment. The bicycle rim 612 is made of a main body 620 of primarily a non-metallic composite material body and a metal outer ring 621. The metal outer ring 621 is bonded to the outer periphery of the main body 620. The rim 612 is attached to the hub 14 by the spokes 16 to form a wheel 610 such as seen in FIG. 10. The metal outer ring 621 is a metallic member, while a majority of the first and second circumferential side walls 622 and 624 and the outer bridge 628 are formed a fiber-reinforced polymer material. The only major difference between the rims 12 and 612 is the addition of the metal outer ring 621 which is design for a clincher tire. While the rim 612 is symmetrically illustrated in FIG. 12 with respect to the center plane P, the rim 612 does not need to be symmetrical with respect to the center plane P. Thus, the rim 612 can be non-symmetrical with respect to the center plane P as needed and/or desired.

The metal outer ring 621 has a pair of opposed retaining ridges 621a that define an annular tire engagement structure (first and second tire bead receiving grooves) on first and second outer peripheral edges, respectively. The annular tire engagement structure defined by the ridges 621a is disposed radially outward of the first and second circumferential side walls 622 and 624 with respect to a rotational center axis of the bicycle rim 612. The metal outer ring 621 includes brake contact areas 621b disposed adjacent the circumferential side walls 622 and 624 of the main body 620.

The metal outer ring 621 is typically a metal extrusion that is butted into its self to form a hoop. However, the metal outer ring 621 can be constructed of a wide variety of substantially rigid material, such as those materials that are well known in the art. For example, the rim 12 can be constructed of any suitable metallic material, such as plated steel, stainless steel, aluminum alloy, magnesium alloy or titanium alloy.

Here, in the bicycle rim 612 of FIG. 12, the bicycle rim 612 includes annular structural support layers 632, 634, 636, 638 and 640 (the first portion) and a pair of annular thermally conductive layers 644 and 646 (the second portion) with a binder material 642 to bond the layers together. The structural support layers 632, 634, 636, 638 and 640 are the same as the structural support layers 32, 34, 36, 38 and 40, as discussed above. Also the thermally conductive layers 644 and 646 are the same as the thermally conductive layers 44 and 46, as discussed above. The thermally conductive layers 644 and 646 (the second portion) are disposed at least partially on outermost ends of the first and second circumferential side walls 622 and 624 with respect to a radial direction of the bicycle rim 612 so that they can dissipate heat from the metal outer ring 621. The amount of resin or binder material 642 between the metal outer ring 621 and the thermally conductive layers 644 and 646 is very small. In the drawings, the distance between the metal outer ring 621 and the thermally conductive layers 644 and 646 is exaggerated in the drawings for the purpose of illustration only.

The thermally conductive layers 644 and 646 (the second portion) overlie structural support layers 632, 634, 636, 638 and 640 (the first portion) of the first and second circumferential side walls 622 and 624 such that the thermally conductive layers 644 and 646 are externally most layers of the first and second circumferential side walls 622 and 624. Also thermally conductive layers 644 and 646 extend radially inward from adjacent the metal outer ring 621 along a majority of the at least one of the first and second circumferential walls 622 and 624 with respect to a rotational center axis of the bicycle rim 612.

Figure 13:
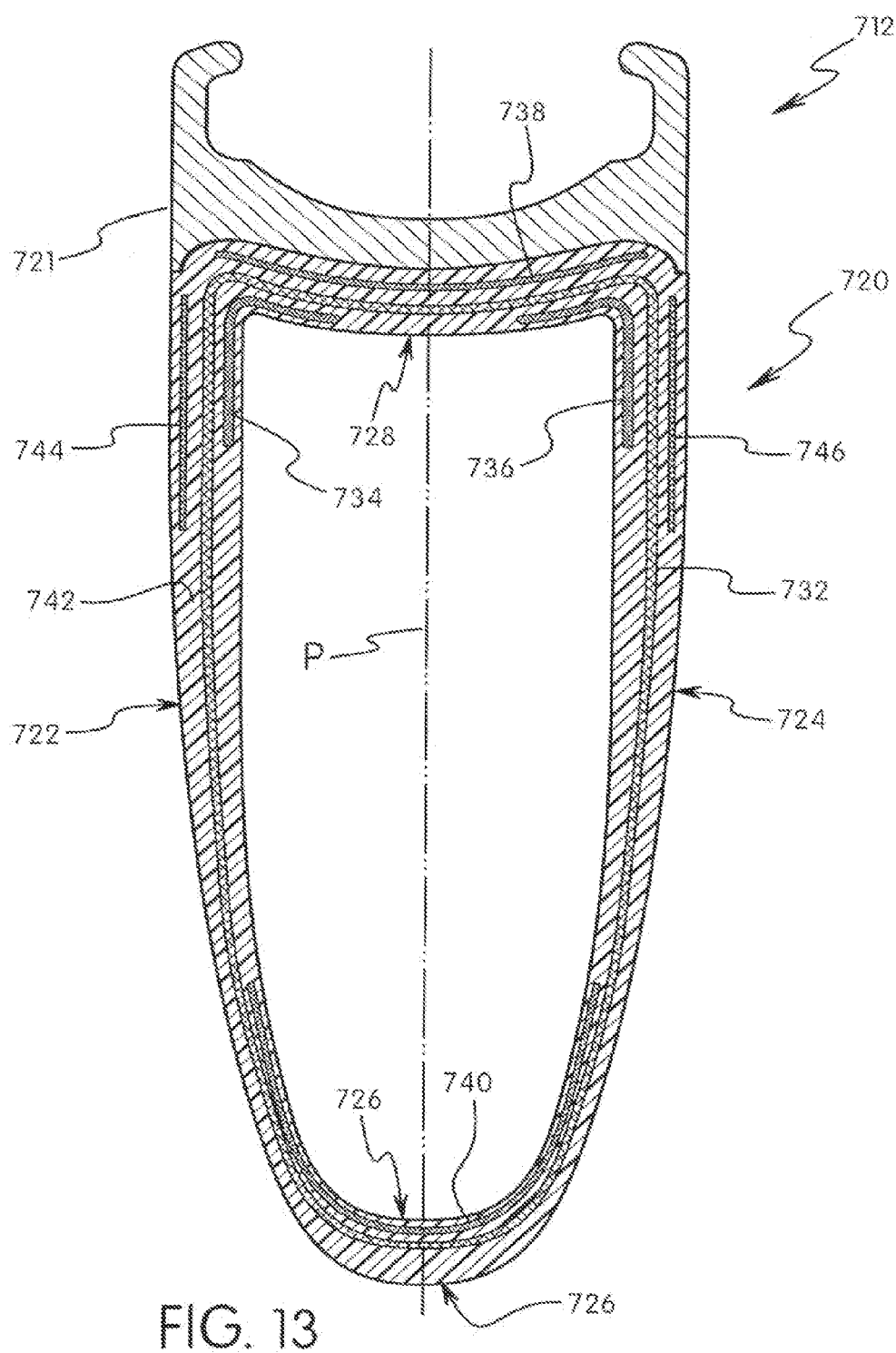
FIG. 13 is an enlarged, partial cross-sectional view of a bicycle rim in accordance with a first variation of the second embodiment.

Referring now to FIG. 13, a bicycle rim 712 is illustrated in accordance with a first variation of the second embodiment. The bicycle rim 712 is made of a main body 720 of primarily a non-metallic composite material body and a metal outer ring 721. The metal outer ring 721 is bonded to the outer periphery of the main body 720. The rim 712 is attached to the hub 14 by the spokes 16 in the same manner as the rim 612 to form a wheel such as seen in FIG. 10. The rim 712 basically includes first and second circumferential side walls 722 and 724 that are connected at their inner ends to form an inner annular portion 726. The outer ends of the first and second circumferential side walls 722 and 724 are connected together by an outer bridge 728. The only difference between the rims 612 and 712 is the arrangement and configuration the layers. In view of the similarity between the rims 612 and 712, the descriptions of the parts of the first variation of the second embodiment that are essential identical in function to the parts of the second embodiment have been omitted for the sake of brevity.

Here, in the bicycle rim 712 of FIG. 13, the bicycle rim 712 includes annular structural support layers 732, 734, 736, 738 and 740 (the first portion) and a pair of annular thermally conductive layers 744 and 746 (the second portion) with a binder material 742 to bond the layers together. The structural support layers 732, 734, 736, 738 and 740 are the same as the structural support layers 632, 634, 636, 638 and 640 of FIG. 12. Also the thermally conductive layers 744 and 746 are the same as the thermally conductive layers 644 and 646, but shorter. The thermally conductive layers 744 and 746 (the second portion) are disposed at least partially on outermost ends of the first and second circumferential side walls 722 and 724 with respect to a radial direction of the bicycle rim 712. The thermally conductive layers 744 and 746 (the second portion) overlie the first portion of the first and second circumferential side walls 722 and 724 such that the thermally conductive layers 744 and 746 are externally most layers of the first and second circumferential side walls 722 and 724.

Figure 14:
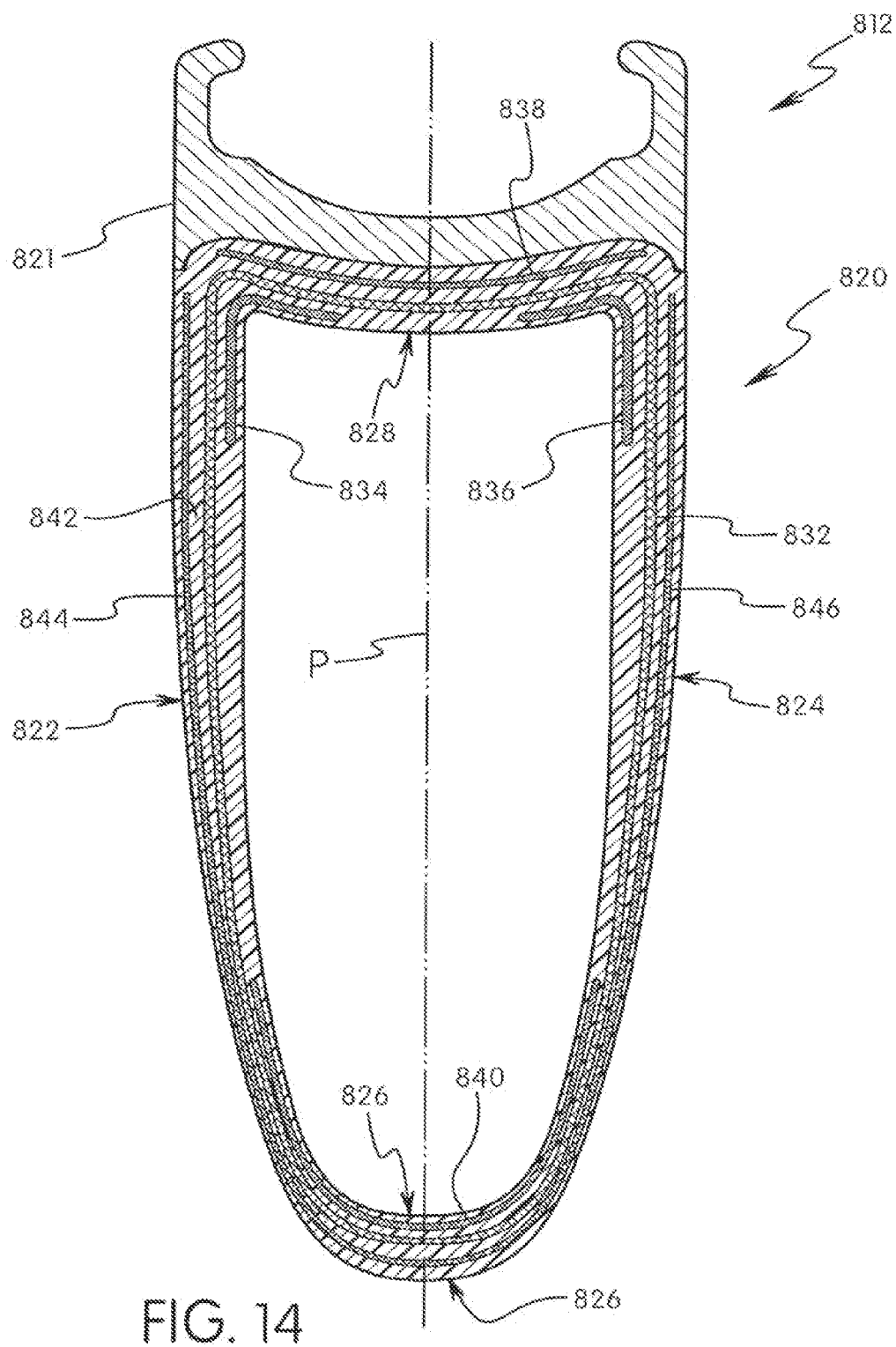
FIG. 14 is an enlarged, partial cross-sectional view of a bicycle rim in accordance with a second variation of the second embodiment.

Referring now to FIG. 14, a bicycle rim 812 is illustrated in accordance with a second variation of the second embodiment. The bicycle rim 812 is made of a main body 820 of primarily a non-metallic composite material body and a metal outer ring 821. The metal outer ring 821 is bonded to the outer periphery of the main body 820. The rim 812 is attached to the hub 14 by the spokes 16 in the same manner as the rim 612 to form a wheel such as seen in FIG. 10. The rim 812 basically includes first and second circumferential side walls 822 and 824 that are connected at their inner ends to form an inner annular portion 826. The outer ends of the first and second circumferential side walls 822 and 824 are connected together by an outer bridge 828. The only difference between the rims 612 and 812 is the arrangement and configuration the layers. In view of the similarity between the rims 612 and 812, the descriptions of the parts of the second variation of the second embodiment that are essential identical in function to the parts of the second embodiment have been omitted for the sake of brevity.

Here, in the bicycle rim 812 of FIG. 14, the bicycle rim 812 includes annular structural support layers 832, 834, 836, 838 and 840 (the first portion) and an annular thermally conductive layer 844 (the second portion) with a binder material 842 to bond the layers together. The structural support layers 832, 834, 836, 838 and 840 are the same as the structural support layers 632, 634, 636, 638 and 640 of FIG. 12. Also the thermally conductive layer 844 is basically the thermally conductive layers 644 and 646 of FIG. 12 being connected across the inner annular portion 826. The thermally conductive layer 844 (the second portion) overlies the first portion of the first and second circumferential side walls 822 and 824 such that the thermally conductive layer 844 is an externally most layer of the first and second circumferential side walls 822 and 824. Also, the thermally conductive layer 844 extends a full radial dimension from adjacent the annular tire engagement structure to the inner annular portion 826 (a radially innermost point) of the first and second circumferential side walls 822 and 824 with respect to a rotational center axis of the bicycle rim 812.

Figure 15:
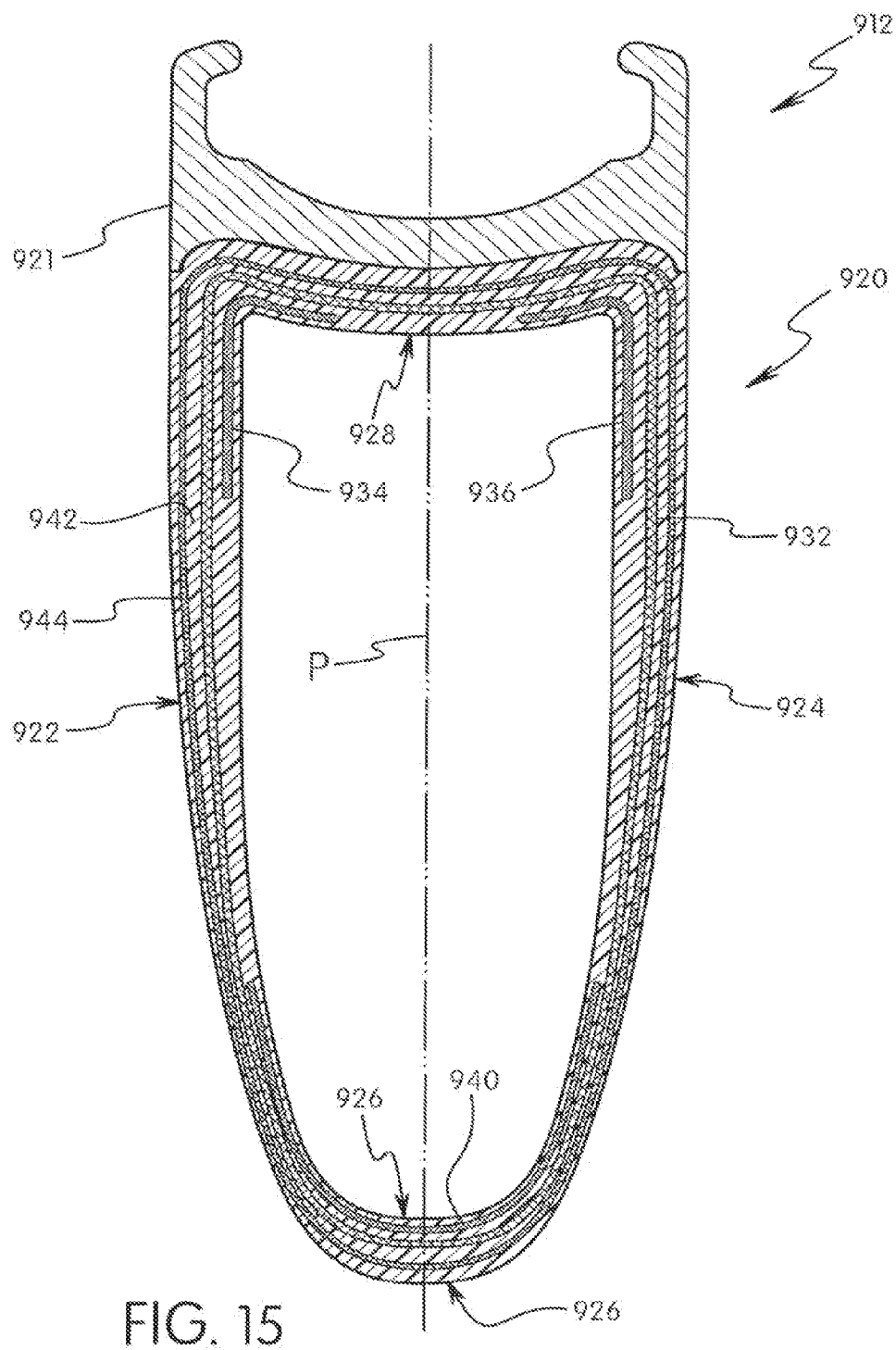
FIG. 15 is an enlarged, partial cross-sectional view of a bicycle rim in accordance with a third variation of the second embodiment.

Referring now to FIG. 15, a bicycle rim 912 is illustrated in accordance with a third variation of the second embodiment. The bicycle rim 912 is made of a main body 920 of primarily a non-metallic composite material body and a metal outer ring 921. The metal outer ring 921 is bonded to the outer periphery of the main body 920. The rim 912 is attached to the hub 14 by the spokes 16 in the same manner as the rim 612 to form a wheel such as seen in FIG. 10. The rim 912 basically includes first and second circumferential side walls 922 and 924 that are connected at their inner ends to form an inner annular portion 926. The outer ends of the first and second circumferential side walls 922 and 924 are connected together by an outer bridge 928. The only difference between the rims 612 and 912 is the arrangement and configuration the layers. In view of the similarity between the rims 612 and 912, the descriptions of the parts of the third variation of the second embodiment that are essential identical in function to the parts of the second embodiment have been omitted for the sake of brevity.

Here, in the bicycle rim 912 of FIG. 15, the bicycle rim 912 includes annular structural support layers 932, 934, 936, 938 and 940 (the first portion) and an annular thermally conductive layer 944 (the second portion) with a binder material 942 to bond the layers together. The structural support layers 932, 934, 936, 938 and 940 are the same as the structural support layers 632, 634, 636, 638 and 640 of FIG. 12. Also the thermally conductive layer 944 is basically the thermally conductive layers 644 and 646 of FIG. 12 being connected across both the inner annular portion 926 and the outer bridge 928. Also the thermally conductive layer 944 (the second portion) is disposed outside of the structural support layers 932, 934, 936, 938 and 940 (the first portion) in the thickness direction with respect to the center plane P that is perpendicular to a rotational center axis of the bicycle rim 912. Thus, the thermally conductive layer 944 (the second portion) is overlies the structural support layers 932, 934, 936, 938 and 940

(the first portion) such that the thermally conductive layer 944 (the second portion) is an externally most layer of the first and second circumferential side walls 922 and 924, and the such that the thermally conductive layer 944 (the second portion) extends along the outer bridge 928 and extends a full radial dimension of the first and second circumferential walls 922 and 924 with respect to the radial direction of the bicycle rim 912.

Figure 16:
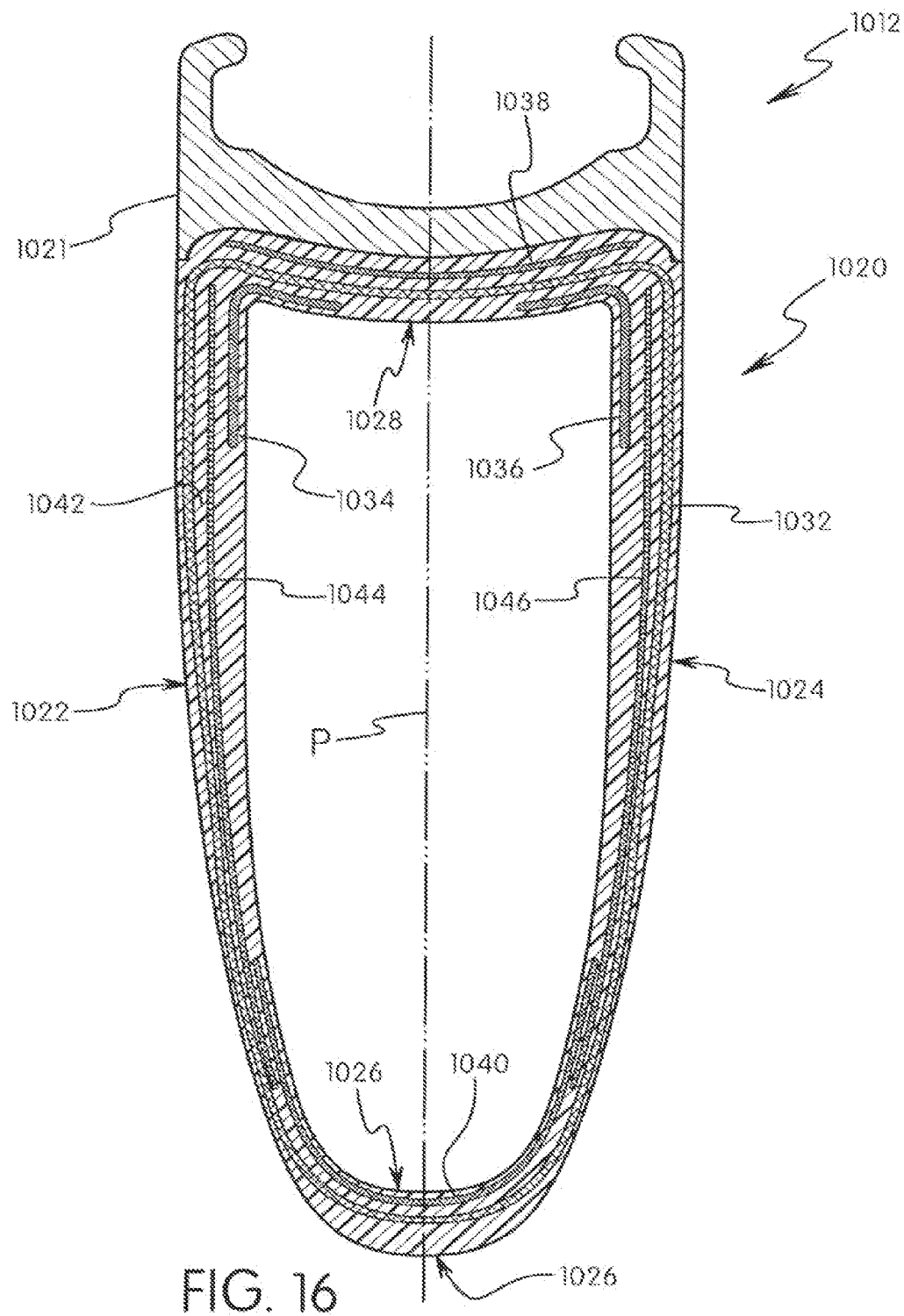
FIG. 16 is an enlarged, partial cross-sectional view of a bicycle rim in accordance with a fourth variation of the second embodiment.

Referring now to FIG. 16, a bicycle rim 1012 is illustrated in accordance with a fourth variation of the second embodiment. The bicycle rim 1012 is made of a main body 1020 of primarily a non-metallic composite material body and a metal outer ring 1021. The metal outer ring 1021 is bonded to the outer periphery of the main body 1020. The rim 1012 is attached to the hub 14 by the spokes 16 in the same manner as the rim 612 to form a wheel such as seen in FIG. 10. The rim 1012 basically includes first and second circumferential side walls 1022 and 1024 that are connected at their inner ends to form an inner annular portion 1026. The outer ends of the first and second circumferential side walls 1022 and 1024 are connected together by an outer bridge 1028. The only difference between the rims 612 and 1012 is the arrangement and configuration the layers. In view of the similarity between the rims 612 and 1012, the descriptions of the parts of the fourth variation of the second embodiment that are essential identical in function to the parts of the second embodiment have been omitted for the sake of brevity.

Here, in the bicycle rim 912 of FIG. 15, the bicycle rim 912 includes annular structural support layers 932, 934, 936 and 940 (the first portion) and an annular thermally conductive layers 944 (the second portion) with a binder material 942 to bond the layers together. The structural support layers 932, 934, 936 and 940 are the same as the structural support layers 632, 634, 636, 638 and 640 of FIG. 12, Also the thermally conductive layer 944 is basically the thermally conductive layers 644 and 646 of FIG. 12 being connected across both the inner annular portion 926 and the outer bridge 928. Also the thermally conductive layer 944 (the second portion) is disposed outside of the structural support layers 932, 934, 936 and 940 (the first portion) in the thickness direction with respect to the center plane P that is perpendicular to a rotational center axis of the bicycle rim 912. Thus, the thermally conductive layer 944 (the second portion) is overlies the structural support layers 932, 934, 936 and 940 (the first portion) such that the thermally conductive layer 944 (the second portion) is an externally most layer of the fist and second circumferential side walls 922 and 924, and the such that the thermally conductive layer 944 (the second portion) extends along the outer bridge 928 and extends a full radial dimension of the first and second circumferential walls 922 and 924 with respect to the radial direction of the bicycle rim 912.

Figure 17:
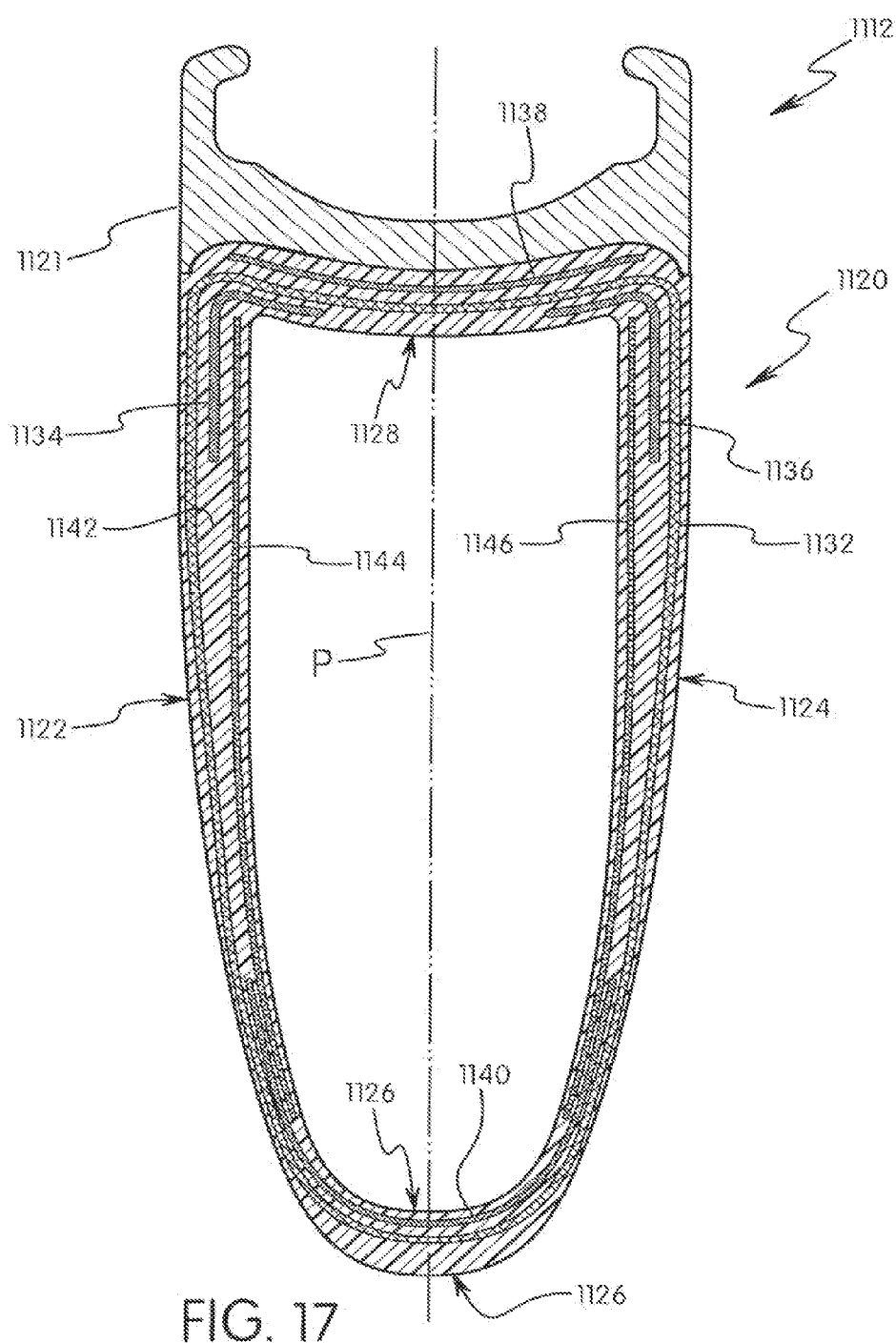
FIG. 17 is an enlarged, partial cross-sectional view of a bicycle rim in accordance with a fifth variation of the second embodiment.

Referring now to FIG. 17, a bicycle rim 1112 is illustrated in accordance with a fifth variation of the second embodiment. The bicycle rim 1112 is made of a main body 1120 of primarily a non-metallic composite material body and a metal outer ring 1121. The metal outer ring 1121 is bonded to the outer periphery of the main body 1120. The rim 1112 is attached to the hub 14 by the spokes 16 in the same manner as the rim 612 to form a wheel such as seen in FIG. 10. The rim 1112 basically includes first and second circumferential side walls 1122 and 1124 that are connected at their inner ends to form an inner annular portion 1126. The outer ends of the first and second circumferential side walls 1122 and 1124 are connected together by an outer bridge 1128. The only difference between the rims 612 and 1112 is the arrangement and configuration the layers. In view of the similarity between the rims 612 and 1112, the descriptions of the parts of the fifth variation of the second embodiment that are essential identical in function to the parts of the second embodiment have been omitted for the sake of brevity.

Here, in the bicycle rim 1112 of FIG. 17, the bicycle rim 1112 includes annular structural support layers 1132, 1134, 1136, 1138 and 1140 (the first portion) and a pair of annular thermally conductive layers 1144 and 1146 (the second portion) with a binder material 1142 to bond the layers together. The structural support layers 1132, 1134, 1136, 1138 and 1140 are the same as the structural support layers 632, 634, 636, 638 and 640 of FIG. 12. Also the thermally conductive layers 1144 and 1146 are the same as the thermally conductive layers 644 and 646, but with the thermally conductive layers 1144 and 1146 (the second portion) being disposed inside of the structural support layers 1132, 1134, 1136, 1138 and 1140 (the first portion) with respect to the thickness direction with respect to the center plane P that is perpendicular to a rotational center axis of the bicycle rim 1112. Also the thermally conductive layers 1144 and 1146 (the second portion) disposed inside of all fiber-reinforced polymer layers forming the first portion of the first and second circumferential side walls 1122 and 1124 such that the thermally conductive layers 1144 and 1146 are internally most layer of the first and second circumferential side walls 1122 and 1124.

Figure 18:
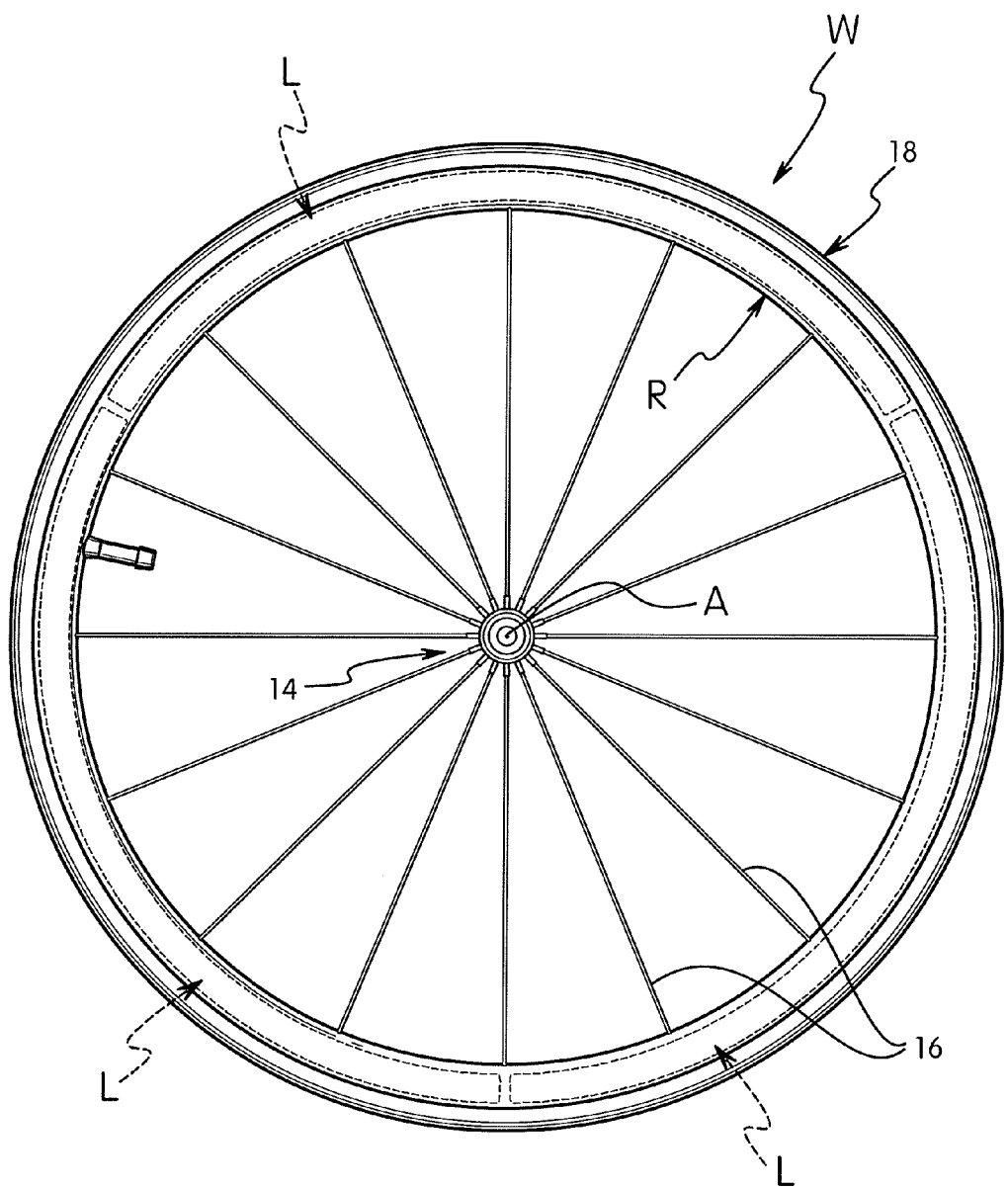
FIG. 18 is a side elevational view of a bicycle wheel that is equipped with a bicycle rim made in accordance with a third embodiment.

Referring to FIG. 18, a wheel W is illustrated with a rim R. The rim R can be identical to any of the prior rims, but with the thermally conductive layer(s) L being discontinuously arranged in the circumferential direction of the rim R.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Accordingly, these terms, as utilized to describe the bicycle rim should be interpreted relative to a bicycle equipped with the bicycle rim as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle rim comprising:
a first circumferential side wall made at least partially of a binder material, and having a radial inner end and a radial outer end;
a second circumferential side wall made at least partially of the binder material, and having a radial inner end and a radial outer end; and
an outer bridge made at least partially of the binder material and connecting the radial outer ends between the first and second circumferential side walls,
at least one of the first and second circumferential side walls including a first portion of a non-resin material with a first thermal conductivity and a second portion comprising a thermally conductive layer of a non-resin material with a second thermal conductivity higher than the first thermal conductivity of the first portion,
the second portion being configured to extend from a brake contact area of the at least one of the first and second circumferential side walls to at least a radial middle of the at least one of the first and second circumferential side walls with respect to a rotational center axis of the bicycle rim,
the first portion and the second portion being covered by the binder material such that an outer surface of the bicycle rim is made of the binder material at least at a portion corresponding to the at least one of the first and second circumferential side walls in which the first portion and the second portion are included,
the second portion extending more than half in a circumferential direction along the at least one of the first and second circumferential side walls, with the first and second portions at least partially overlapping in a thickness direction of the at least one of the first and second circumferential side walls,
the second portion being configured such that the thermally conductive layer does not extend into the outer bridge.

2. The bicycle rim according to claim 1, wherein the second portion is continuously arranged in the circumferential direction.

3. The bicycle rim according to claim 1, wherein the second portion is discontinuously arranged in the circumferential direction.

4. The bicycle rim according to claim 1, wherein the second portion is an annular member.

5. The bicycle rim according to claim 1, wherein the second portion includes at least one fiber layer.

6. The bicycle rim according to claim 1, wherein the second portion includes at least one metallic layer.

7. The bicycle rim according to claim 1, wherein
each of the first and second circumferential side walls includes the first portion with the first thermal conductivity and the second portion with the second thermal conductivity.

8. The bicycle rim according to claim 1, wherein
a majority of the first and second circumferential side walls and the outer bridge are formed of a fiber-reinforced polymer material.

9. The bicycle rim according to claim 1, wherein
the first circumferential side wall includes a first brake contact area, and
the second circumferential side wall includes a second brake contact area.

10. The bicycle rim according to claim 1, wherein
the second portion is disposed at least partially radially inward of a brake contact area with respect to a radial direction of the bicycle rim.

11. The bicycle rim according to claim 1, wherein
the second portion is configured to extend from the brake contact area of the at least one of the first and second circumferential side walls to a most radial inner portion of the at least one of the first and second circumferential side walls with respect to a rotational center axis of the bicycle rim.

12. The bicycle rim according to claim 1, wherein
the second portion is disposed outside of the first portion in the thickness direction with respect to a center plane that is perpendicular to a rotational center axis of the bicycle rim.

13. The bicycle rim according to claim 1, wherein
the second portion is disposed in between two fiber layers forming the first portion with respect to the thickness direction.

14. The bicycle rim according to claim 1, wherein
the second portion is disposed inside of the first portion in the thickness direction with respect to a center plane that is perpendicular to a rotational center axis of the bicycle rim.

15. A bicycle rim comprising:
a first circumferential side wall having a radial inner end and a radial outer end;
a second circumferential side wall having a radial inner end and a radial outer end; and
an outer bridge connecting the radial outer ends between the first and second circumferential side walls,
at least one of the first and second circumferential side walls including a first portion of a non-resin material having a first thermal conductivity and a second portion of a non-resin material having a second thermal conductivity higher than the first conductivity, with the first and second portions being at least partially overlapping in a thickness direction of the at least one of the first and second circumferential side walls,
the second portion being a thermally conductive layer extending more than half in a circumferential direction along the at least one of the first and second circumferential side walls, and extending from a brake contact area of the at least one of the first and second circumferential side walls to at least a radial middle of the at least one of the first and second circumferential side walls with respect to a rotational center axis of the bicycle rim,
the second portion being configured such that the thermally conductive layer does not extend into the outer bridge.

16. The bicycle rim according to claim 1, wherein the thermally conductive layer has a thermal conductivity of at least 50 W/m·K.

17. The bicycle rim according to claim 15, wherein the thermally conductive layer has a thermal conductivity of at least 50 W/m·K.

* * * * *